United States Patent
Tanada et al.

(10) Patent No.: US 7,567,318 B2
(45) Date of Patent: Jul. 28, 2009

(54) REFLECTOR AND LIQUID CRYSTAL DISPLAY PANEL

(75) Inventors: Tetsushi Tanada, Fukushima-ken (JP); Hiroyasu Miyata, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/722,907

(22) Filed: Nov. 25, 2003

(65) Prior Publication Data

US 2004/0105057 A1    Jun. 3, 2004

(30) Foreign Application Priority Data

Nov. 28, 2002 (JP) ............................. 2002-345976
Dec. 5, 2002 (JP) ............................. 2002-353723

(51) Int. Cl.
*G02F 1/1335* (2006.01)
(52) U.S. Cl. ...................... 349/113; 349/114
(58) Field of Classification Search .............. 349/113, 349/114; 359/515
See application file for complete search history.

(56) References Cited

U.S. PATENT DOCUMENTS

| | | | | |
|---|---|---|---|---|
| 4,106,859 A | * | 8/1978 | Doriguzzi et al. | 349/113 |
| 5,361,163 A | * | 11/1994 | Matsuda et al. | 359/452 |
| 6,191,353 B1 | * | 2/2001 | Shiotsuka et al. | 136/256 |
| 6,285,425 B1 | * | 9/2001 | Akins et al. | 349/113 |
| 6,434,815 B1 | * | 8/2002 | Onishi et al. | 29/621 |
| 6,610,766 B1 | * | 8/2003 | Kitamura et al. | 524/156 |
| 6,699,956 B2 | * | 3/2004 | Kudo et al. | 528/15 |
| 6,803,980 B2 | * | 10/2004 | Funahata et al. | 349/113 |
| 2001/0035927 A1 | * | 11/2001 | Sasagawa et al. | 349/113 |
| 2002/0030774 A1 | * | 3/2002 | Yoshii et al. | 349/113 |
| 2002/0054259 A1 | * | 5/2002 | Funahata et al. | 349/113 |
| 2003/0007113 A1 | * | 1/2003 | Yamanaka et al. | 349/113 |
| 2003/0194646 A1 | * | 10/2003 | Ogiso et al. | 430/270.16 |
| 2004/0012726 A1 | * | 1/2004 | Kano et al. | 349/43 |
| 2004/0076396 A1 | * | 4/2004 | Suga | 385/146 |
| 2005/0270473 A1 | * | 12/2005 | Shiao et al. | 349/158 |

FOREIGN PATENT DOCUMENTS

| | | | | |
|---|---|---|---|---|
| JP | 4011149241 A | * | 6/1989 | |
| JP | 2002-22913 | | 1/2002 | |
| JP | 2002022913 A | * | 1/2002 | ............. 428/412 |

* cited by examiner

*Primary Examiner*—David Nelms
*Assistant Examiner*—Thanh-Nhan P Nguyen
(74) *Attorney, Agent, or Firm*—Brinks Hofer Gilson & Lione

(57) ABSTRACT

A reflector includes a heat-embossed layer having a reflective surface having a plurality of recesses, a highly reflective film laminated on the heat-embossed layer and having the reflective surface, and a moisture-proof base material laminated on the opposite side of the heat-embossed layer to the reflective surface. A liquid crystal display panel includes the reflector. The reflector may include an embossed layer having a reflective surface having a plurality of recesses, and an embossed base separable from the embossed layer and disposed on the opposite side of the embossed layer to the reflective surface.

9 Claims, 20 Drawing Sheets

REFLECTOR AND LIQUID CRYSTAL DISPLAY PANEL

This application claims the benefit of priority to Japanese Patent Application Nos. 2002-345976 and 2002-353723, herein incorporated by reference.

BACKGROUND OF THE INVENTION

1. Field of the Invention

The present invention relates to a reflector and a liquid crystal display panel, and particularly to a thin reflector and a liquid crystal display panel causing little deterioration of reflectance over a long period of time.

2. Description of the Related Art

A reflective liquid crystal display device utilizes sunlight, illuminating light of a front light or the like as a light source, and is frequently used for a personal digital assistant and the like required to have low power consumption. A transflective liquid crystal display device as another example of liquid crystal display devices is operated in a transmissive mode with a back light lighted in an environment where external light cannot be sufficiently obtained, and operated in a reflective mode with the back light not lighted when external light can be sufficiently obtained. The transflective liquid crystal display device is frequently used for portable electronic apparatuses such as a cellular phone, a notebook-size personal computer, and the like.

A conventional reflective liquid crystal display device will be described with reference to the drawings. As shown in FIG. 18, a conventional liquid crystal display device 101 roughly comprises a liquid crystal display panel 120, and a front light 110 disposed on the observer side of the liquid crystal display panel 120.

The liquid crystal display panel 120 roughly comprises a first substrate (a substrate) 121 and a second substrate (another substrate) 122 which are opposed to each other with a liquid crystal layer 123 provided therebetween and which are combined together with a sealing material 124. Each of the first substrate 121 and the second substrate 122 is a transparent substrate such as a glass substrate or the like. Also, display circuits 126 and 127 are provided on the liquid crystal layer sides (inner sides) of the substrates 121 and 122, respectively. Although the display circuits 126 and 127 are not shown in particularity in the drawing, the display circuits include an electrode layer comprising a transparent conductive film or the like for driving the liquid crystal layer 123, an alignment film for controlling the orientation of the liquid crystal layer 123, etc. In a color display, the display circuits 126 and 127 may include a color filter.

Also, a reflector 130 is attached to the outer side of the second substrate 122. The reflector 130 comprises a reflecting layer 128 made of a resist resin, a polycarbonate resin, or the like, a planarizing layer 129 laminated on the reflecting layer 128, and an adhesive layer 131 laminated on the planarizing layer 129 and put into contact with the second substrate 122. Furthermore, a plurality of recesses 128b is provided on the surface of the reflecting layer 128, and a highly reflective film 128a made of Al is formed on the recesses 128b. The planarizing layer 129 is laminated in contact with the highly reflective film 128a. The shape of recesses 128b is reflected in the highly reflective film 128a.

The recesses 128b of the reflecting layer 128 are formed by, for example, a so-called heat embossing method (embossing method) in which first, an electroforming pattern having an irregular surface is prepared, and a polycarbonate thin plate used as the reflecting layer is pressed on the heated surface of the electroforming pattern to transfer the irregularities of the surface to the polycarbonate thin plate by embossing.

The front light 110 is disposed on the outside (the observer side) of the first substrate 121 of the liquid crystal display panel 120. The front light 110 comprises a transparent light guide plate 112 made of, for example, an acrylic resin or the like, and a light source 113 comprising a cold-cathode tube provided on the side end 112a. The bottom (facing the liquid crystal display panel 120) of the light guide plate 112 functions as a smooth emission plane 112b through which light is emitted. The opposite surface (the top of the light guide plate 112) of the light guide plate 112 to the emission plane 112b functions as a prism plane 112c having a plurality of wedge grooves formed in stripes with a predetermined pitch for changing the direction of light propagated in the light guide plate 112.

In the conventional reflective liquid crystal display device 101, incident light such as the illuminating light from the front light 110 or sunlight is transmitted through the liquid crystal layer 123 of the liquid crystal display panel 120, reflected by the highly reflective film 128a formed on the reflecting layer 128, again transmitted through the liquid crystal layer 123 and then emitted as emitted light to the observer side. A construction similar to the liquid crystal display device 101 is disclosed in a prior document, for example, Japanese Unexamined Patent Application Publication No. 2002-22913.

Although the conventional liquid crystal display device 101 uses the reflecting layer 128 made of polycarbonate as a base material of the highly reflective film 128a in some cases, the polycarbonate has relatively high moisture absorption and thus has high permeability to moisture. Therefore, atmospheric moisture penetrates into the reflecting layer 128 and reaches the highly reflecting Al film 128a to convert Al to aluminum hydroxide or aluminum oxide with permeated moisture. When Al is converted to aluminum hydroxide or aluminum oxide, the highly reflective film 128a becomes translucent to cause the problem of significantly decreasing the reflectance of the reflector 130.

In the conventional liquid crystal display device 101, the surface of the reflecting layer 128 is formed by the heat embossing method, and thus the thickness of the reflecting layer 128 must be increased to some extent to increase strength. Therefore, the thickness of the reflector 130 is increased to cause the problem of failing to thin the liquid crystal display device 101.

For example, the liquid crystal display device 101 is used as an on-vehicle device, the liquid crystal display device 101 is placed in an environment of high temperature. In this case, considering the linear expansion coefficient of each component member, the linear expansion coefficient of the reflecting layer 128 (polycarbonate) is higher than that of the second substrate 122 (glass), and thus the amount of expansion of the reflecting layer 128 at high temperature becomes large. As a result, as shown in FIG. 29, a part of the reflector 130 is possibly separated from the second substrate 122 since a lift force due to expansion of the reflecting layer 128 exceeds the adhesive force of the adhesive layer 131 to the second substrate 122. Such lifting might significantly impair the appearance of a display device.

SUMMARY OF THE INVENTION

The present invention has been achieved in consideration of the above situation, and embodiments of the present invention provide a reflector causing little deterioration of reflectance over a long period of time, and a liquid crystal display panel comprising the reflector. The embodiments of the present invention also provide a thin reflector causing no separation from a substrate even when a temperature environment greatly changes, and a liquid crystal display panel with high reliability comprising the reflector.

A reflector of the present invention comprises an embossed layer having a reflective surface having a plurality of recesses, and an embossed base disposed on the opposite side of the embossed layer to the reflective surface.

In the reflector of the present invention, the embossed layer is a heat-embossed layer and has a highly reflective film laminated thereon, the highly reflective film having the reflective surface, and the embossed base comprises a moisture-proof base material.

In the reflector of the present invention, the moisture-proof base material is laminated on the heat-embossed layer, and thus the moisture-proof base material can prevent moisture penetration from the opposite side of the heat-embossed layer to the reflective surface, thereby preventing the oxidation of the highly reflective film to maintain the reflectance of the reflector high over a long period of time.

In the reflector of the present invention, the moisture-proof base material preferably comprises polyphenylene sulfide or polyvinylidene fluoride. Such a material has relatively low moisture absorption, and can thus prevent moisture penetration into the heat-embossed layer.

In the above-described reflector of the present invention, the heat-embossed layer comprises a lamination of a processed resin layer disposed on the reflective surface side and having the recesses, and a support resin layer disposed on the moisture-proof base material side and exhibiting a higher glass transition temperature than that of the processed resin layer.

In general, a resin having a low glass transition temperature has the property of high processability because of its flexible molecular chain, and a resin having a high glass transition temperature has the property of low moisture absorption. The reflector of the present invention comprises the support resin layer disposed on the moisture-proof base material side and showing a high glass transition temperature, and thus moisture penetration into the processed resin layer can be blocked to prevent the oxidation of the highly preventing film, thereby maintaining the reflectance of the reflector high. Also, the processed resin layer having high processability and a lower glass transition temperature than that of the support resin layer is disposed on the reflective surface side, and thus the recesses can easily be formed in the reflective surface, forming the reflector having an excellent reflection property.

The reflector of the present invention preferably further comprises an adhesive layer laminated on the highly reflective film, and a protecting material provided on the adhesive layer. In the reflector, the protecting material can be separated to expose the adhesive layer so that the reflector can be easily mounted on the liquid crystal display panel or the like with the adhesive layer. Also, the adhesive layer functions as a protecting layer for protecting the reflective surface.

A liquid crystal display panel of the present invention comprises a first substrate having a display surface, a second substrate disposed opposite to the first substrate, a liquid crystal layer disposed between the first and second substrates, and a reflector disposed on the second substrate opposite to the liquid crystal layer side. The reflector comprises a heat-embossed layer with a reflective surface facing the liquid crystal layer side and having a plurality of recesses, a highly reflective film laminated on the heat-embossed layer to form the reflective surface, and a moisture-proof base material laminated on the opposite side of the heat-embossed layer to the reflective surface.

In the liquid crystal display panel of the present invention, the moisture-proof base material is laminated on the heat-embossed layer of the reflector, and thus moisture penetration from the opposite side of the heat-embossed layer to the reflective surface can be prevented by the moisture-proof base material to prevent the oxidation of the highly reflective film, thereby maintaining the reflectance of the reflector high over a long period of time.

In the reflector of the present invention, the embossed base can be separated from the embossed layer.

Since the embossed base can be separated from the embossed layer, the embossed base can be separated after the reflector is mounted on a liquid crystal display panel or the like, and thus the total thickness of the reflector can be decreased.

Since the embossed base separable from the embossed layer is provided, the strength of the whole of the reflector is compensated by the embossed base even when the embossed layer is thinned. Therefore, heat embossing can be performed for a thinner embossed layer than a conventional layer without any trouble. Also, the embossed layer can be made thinner than a conventional layer, and even when the embossed layer greatly expands in an environment of high temperature, a lift force due to expansion is lower than that of a conventional reflector, thereby preventing separation from the liquid crystal display panel or the like.

The reflector of the present invention preferably further comprises a separating layer provided between the embossed layer and the embossed base. In the reflector, the embossed base can easily be separated together with the separating layer.

The reflector of the present invention preferably further comprises an adhesive layer laminated on the reflective surface, and a protecting layer provided on the adhesive layer. In the reflector, the protecting layer can be separated to expose the adhesive layer so that the reflector can easily be mounted on the liquid crystal display panel with the adhesive layer. The adhesive layer also functions as a protecting layer for protecting the reflective surface.

In the reflector of the present invention, the embossed layer may include a thermoplastic resin or an ultraviolet curable resin.

In the above-described liquid crystal display panel of the present invention comprising the first substrate having the display surface, the second substrate disposed opposite to the first substrate, the liquid crystal layer disposed between the first and second substrates, and the reflector disposed on the opposite side of the second substrate to the liquid crystal layer side, the reflector may comprise an adhesive layer disposed on the second substrate, an embossed layer laminated on the adhesive layer with a reflective surface facing the liquid crystal layer side and having a plurality of recesses, and an embossed base separable from the embossed layer and disposed on the opposite side of the embossed layer to the reflective surface.

In the reflector of the present invention, the embossed base can be separated from the embossed layer so that the embossed base can be separated after the reflector is mounted on the second substrate, and thus the total thickness of the liquid crystal display panel can be decreased.

Since the embossed base separable from the embossed layer is provided, the entire strength of the reflector is compensated by the embossed base even when the embossed layer is thinned. Therefore, heat embossing can be performed for a thinner embossed layer than a conventional layer without any trouble. Also, the embossed layer can be made thinner than a conventional layer, and even when the embossed layer greatly expands in an environment of high temperature, a lift force due to expansion is lower than that of a conventional reflector, thereby preventing separation of the reflector from the second substrate.

DESCRIPTION OF THE PREFERRED EMBODIMENTS

Embodiments of the present invention will be described below with reference to the drawings.

First Embodiment

Figure 1:
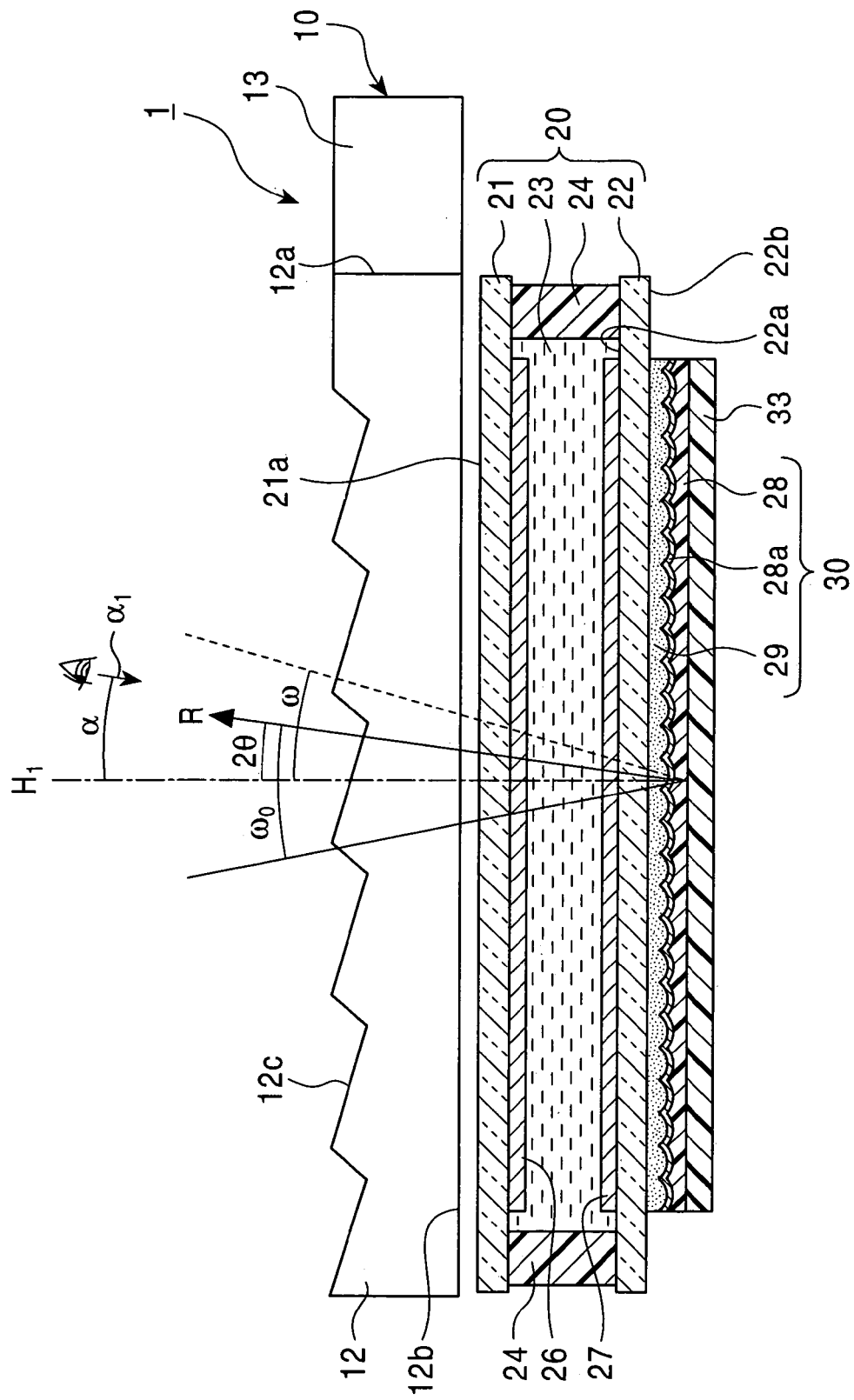
FIG. 1 is a schematic sectional view of a liquid crystal display device according to a first embodiment of the present invention.
Figure 2:
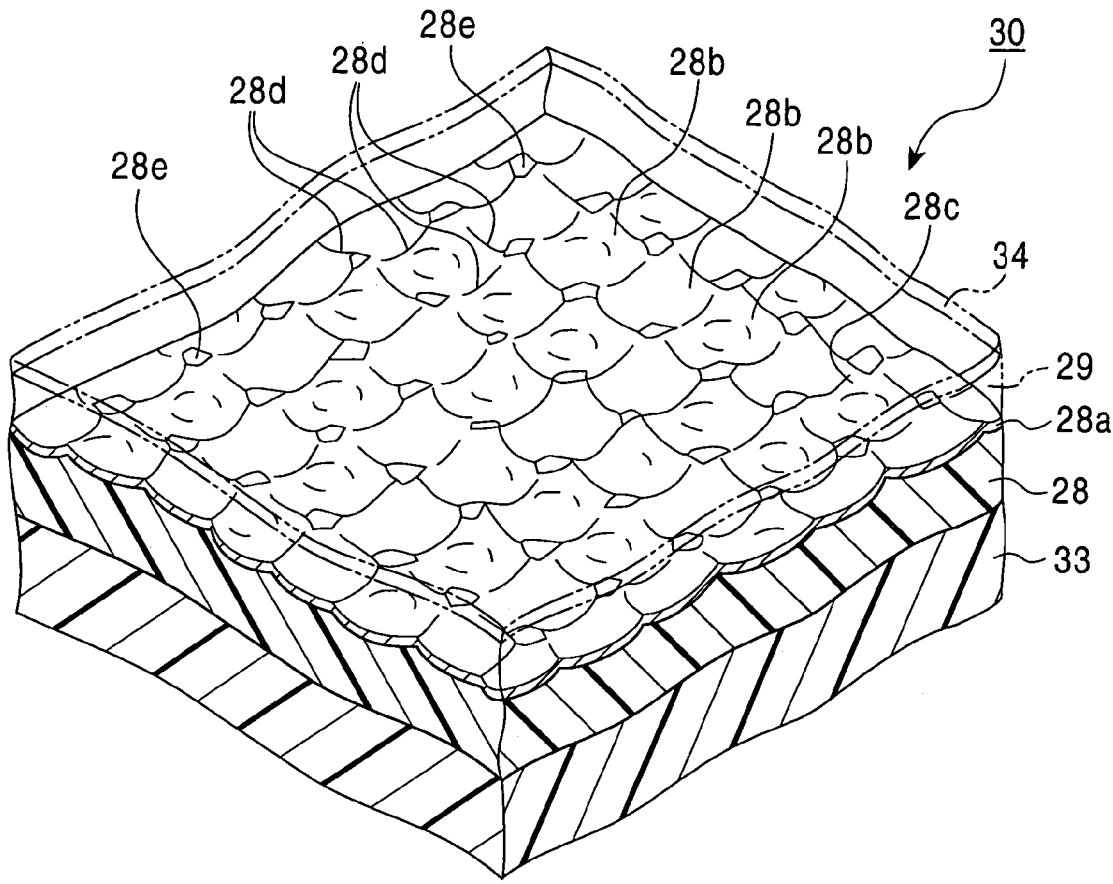
FIG. 2 is a perspective view showing a reflector mounted on the liquid crystal display device shown in FIG. 1.
Figure 3:
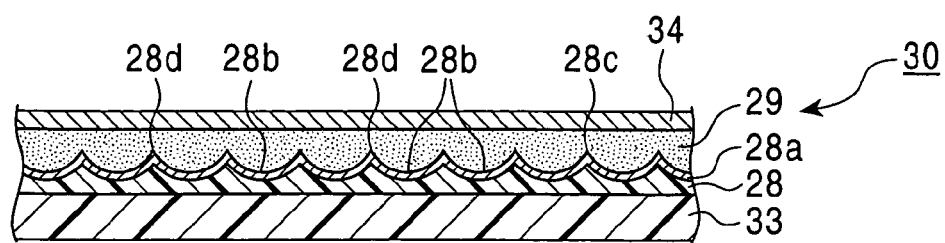
FIG. 3 is a schematic sectional view showing the reflector mounted on the liquid crystal display device shown in FIG. 1.

FIG. 1 is a schematic sectional view showing a liquid crystal display device according to a first embodiment of the present invention, FIG. 2 is a perspective view showing a reflector mounted on the liquid crystal display device shown in FIG. 1, and FIG. 3 is a schematic sectional view showing the reflector shown in FIG. 2. As shown in FIG. 1, the liquid crystal display device 1 of this embodiment is a reflective type and roughly comprises a liquid crystal display panel 20, and a front light 10 disposed on the observer side of the liquid crystal display panel 20.

As shown in FIG. 1, the liquid crystal display panel 20 roughly comprises a first substrate 21 and a second substrate 22 which are opposed to each other with a liquid crystal layer 23 provided therebetween and combined together with a sealing material 24. The outer surface of the first substrate 21 functions as a display surface 21a. Each of the first substrate 21 and the second substrate 22 is a transparent substrate such as a glass substrate, and display circuits 26 and 27 are provided on the liquid crystal layer sides (inner sides) of the first and second substrates 21 and 22, respectively. Although the display circuits 26 and 27 are not shown in particularity in the drawings, the display circuits 26 and 27 include an electrode layer comprising a transparent conductive film for driving the liquid crystal layer 23, an alignment film for controlling the orientation of the liquid crystal layer 23, and the like. In a color display, the display circuits 26 and 27 may include a color filter.

As shown in FIG. 1, the front light 10 is disposed on the display surface 21a (observer side) of the first substrate 21 of the liquid crystal display panel 20. The front light 10 comprises a transparent light guide plate 12 made of, for example, an acrylic resin, and a light source 13 comprising a cold-cathode tube or the like and provided at the side end 12a of the light guide plate 12. The bottom (facing the liquid crystal display panel 20) of the light guide plate 12 functions as a smooth emission plane 12b through which light is emitted. The opposite side (top of the light guide plate 12) of the light guide plate 12 to the emission plane 12b functions as a prism plane 12c having a plurality of wedge grooves formed in stripes with a predetermined pitch for changing the direction of light propagated through the light guide plate 12.

As shown in FIG. 1, a reflector 30 is provided on the outer surface of the second substrate 22, i.e., the opposite outer surface 22b of the second substrate 22 to the liquid crystal layer-facing surface 22a. As shown in FIG. 1, the reflector 30 schematically comprises a heat-embossed layer 28 made of polycarbonate or the like, an adhesive layer 29 laminated on the heat-embossed layer 28, and a moisture-proof base material 33.

The reflector 30 will be described in further detail below. As shown in FIGS. 2 and 3, the reflector 30 roughly comprises the heat-embossed layer 28 having a reflective surface 28c having a plurality of recesses 28b, a highly reflective film 28a laminated on the heat-embossed layer 28 to form the reflective surface 28c, and the moisture-proof base material 33 laminated on the opposite surface of the heat-embossed layer 28 to the reflective surface 28c. Also, the adhesive layer 29 is laminated on the highly reflective film 28a.

As shown in FIGS. 2 and 3, the surface shape of the heat-embossed layer 28 including the recesses 28b is reflected in the shape of the highly reflective film 28a, and thus the highly reflective film 28a has an irregular surface functioning as the reflective surface 28c. Each of the recesses 28b preferably has a substantially spherical shape or an asymmetrically spherical shape.

The heat-embossed layer 28 comprises a material having a relatively low glass transition temperature Tg, for example, polycarbonate or the like, so that the recesses 28b can easily be formed in the surface by a heat embossing method (so-called embossing method), as described below.

The thickness of the heat-embossed layer 28 is preferably in the range of 2 μm to 100 μm. A thickness of less than 2 μm is undesirable because of a difficulty in forming the recesses 28b by the heat embossing method described below, while a thickness of over 100 μm is undesirable because the whole thickness of the reflector 30 is increased to make it impossible to thin the liquid crystal display panel 20.

The highly reflective film 28a comprises a metal with high reflectance, such as Al, Ag, or the like, and is formed by evaporation or the like. The thickness of the highly reflective film 28a is preferably in the range of 80 nm to 200 nm. A thickness of less than 80 nm is undesirable because the reflectance of the highly reflective film 28a becomes excessively low to darken a display, while a thickness of over 200 nm is undesirable because of the excessively high deposition cost and small protrusions formed by the recesses 28b.

The recesses 28b are formed by heat embossing (so-called embossing) of the heat-embossed layer 28. As shown in FIGS. 2 and 3, in the reflective film 28a, the outlines 28d of the respective recesses 28b are in contact with each other. The contact portions between the adjacent outlines 28d are peaked to decrease the area of flat portions 28e between the respective recesses 28b.

Figure 4A:
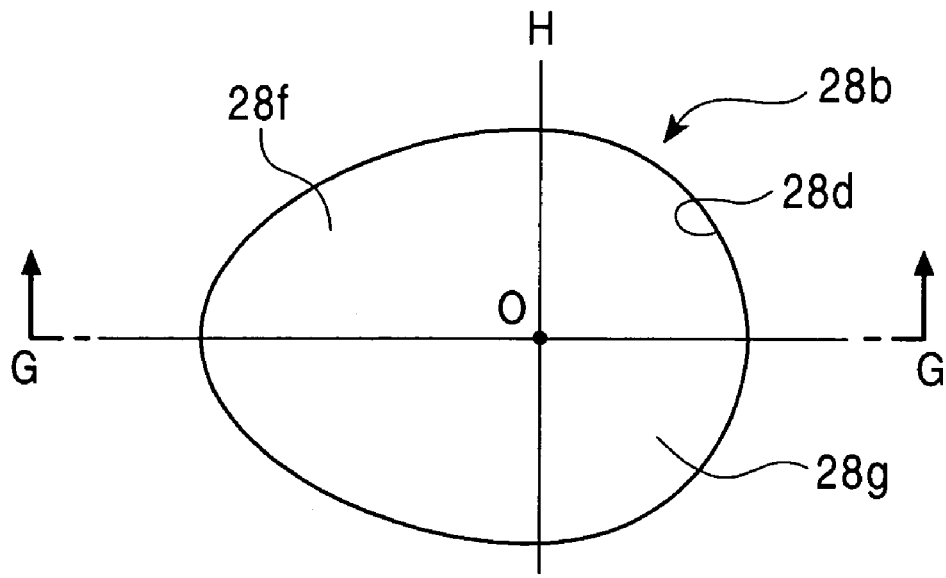
FIGS. 4A and 4B are a schematic plan view and a schematic sectional view, respectively, showing the outline of a recess provided in the reflector shown in FIG. 2.
Figure 4B:
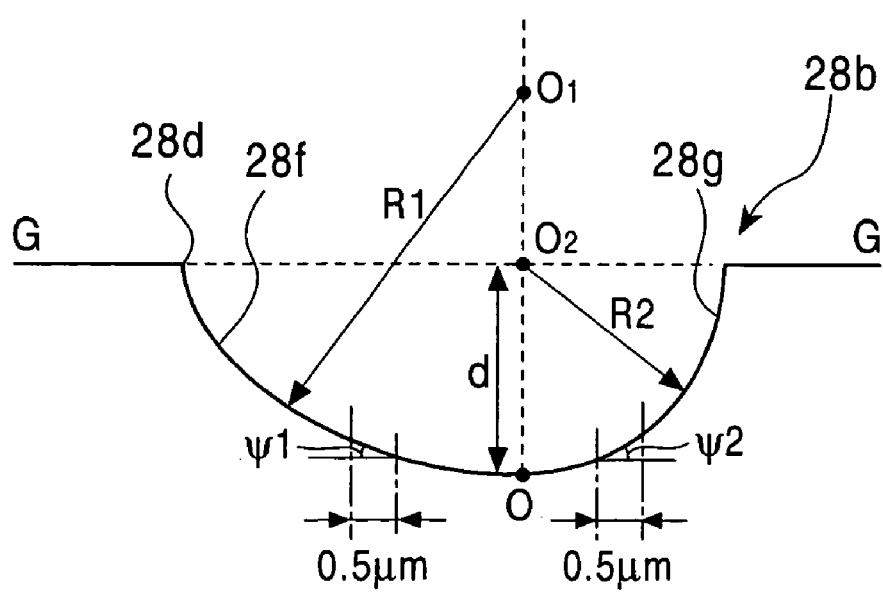

As shown in FIGS. 4A and 4B, the inner surface of each recess 28b includes a first curved surface 28f and a second curved surface 28g which are parts of two spherical surfaces having different radii, and the centers O1 and O2 of both curved surfaces 28f and 28g, respectively, are disposed on a normal line at the vertex O of each recess 28b. The first curved surface 28f is a part of a spherical surface having a radius R1 with the center O1, and the second curved surface 28g is a part of a spherical surface having a radius R2 with the center O2. In a plan view of FIG. 4A, each recess 28b is roughly divided into the first curved surface 28f and the second curved surface 28g near a straight line H perpendicular to G-G line and passing through the vertex O of each recess 28b. The depth of each recess 28b is about 0.3 μm to 2.0 μm.

Figure 5:
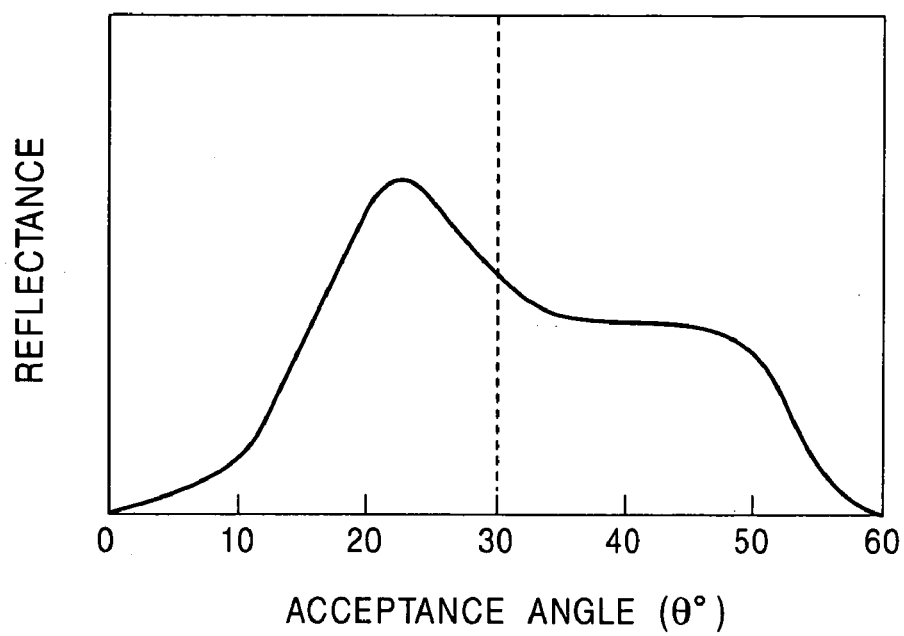
FIG. 5 is a graph showing the reflection property of the reflector shown in FIG. 2.

FIG. 5 is a graph showing the measurement results of reflectance (%) of the reflector 30 having the above construction in irradiation with light from the right side in FIG. 4 at an incidence angle of 30° while the acceptance angle was changed in the range of ±30° (0° to 60°; 0° corresponds to the normal direction to a surface of the reflector) with 30° in the regular reflection direction of the reflective surface as a center.

As shown in FIG. 5, in the reflector 30 having the above construction, the absolute value of the inclination angle of the second curved surface 28g comprising a spherical surface with a relatively small radius is relatively high, and thus reflected light is scattered at a wide angle to achieve high reflectance in the wide acceptance angle of about 15° to 50°. Also, light is reflected by the first curved surfaces 28f each comprising a spherical surface having a relatively large radius in specified directions in a narrower range than that by the second curved surfaces 28g. Therefore, as a whole, the reflectance becomes maximum at an angle smaller than 30° in the regular reflection direction, and the reflectance near the peak is also increased. As a result, the peak of light incident and reflected by the reflector 30 is shifted to the normal direction to the reflector 30 from the regular reflection direction, thereby increasing the reflection luminance in the front direction of the reflector 30. For example, when the reflector 30 of this embodiment is applied to a reflecting layer of the liquid crystal display device 1, therefore, the reflection luminance in the front direction of the liquid crystal display device 1 can be improved to improve the luminance in the observer direction of the liquid crystal display device 1.

As shown in FIGS. 2 and 3, the moisture-proof base material 33 is laminated on the opposite side of the heat-embossed layer 28 to the reflective surface 28c. The moisture-proof base material 33 is preferably made of a material with low moisture absorption, for example, polyphenylene sulfide or polyvinylidene fluoride. Such a material has particularly low moisture absorption among resins, and thus has low permeability to moisture. Therefore, when the moisture-proof base material 33 is laminated on the side opposite to the reflective surface 28c, moisture penetration into the heat-embossed layer 28 can be prevented.

The thickness of the moisture-proof base material 33 is preferably in the range of 0.05 mm to 1 mm. A thickness of less than 0.05 mm is undesirable because the highly reflective film 28a deteriorates due to the large amount of moisture permeated, while a thickness of over 1 mm is undesirable because the thickness of the reflector 30 is increased to cause complexity in handling.

As shown in FIGS. 2 and 3, the adhesive layer 29 is made of a transparent adhesive material and functions to bond the reflector 30 to the second substrate 22 of the liquid crystal display panel 20 and protect the reflective surface 28c. The thickness of the adhesive layer 29 is preferably in the range of 10 µm to 50 µm. A thickness of less than 10 µm is undesirable because the shape of the reflective surface 28c is reflected in the bonding surface of the adhesive layer 29 to form the irregular bonding surface, thereby leaving bubbles on the bonding surface in bonding to the second substrate 22, while a thickness of over 50 µm is undesirable because the total thickness of the reflector 30 is increased to fail to thin the liquid crystal display panel 20.

In the liquid crystal display device 1 of this embodiment, illuminating light from the front light 10 or sunlight is incident on the liquid crystal display panel 20, transmitted through the liquid crystal layer 23, reflected by the highly reflective film 28a provided on the heat-embossed layer 28, again transmitted through the liquid crystal layer 23, and then emitted as emitted light to the observer side.

In the reflector 30 of this embodiment, the moisture-proof base material 33 is laminated on the heat-embossed layer 28, and thus moisture penetration from the opposite side of the heat-embossed layer 28 to the reflective surface 28c can be prevented by the moisture-proof base material 33 to prevent the oxidation of the highly reflective film 28a, thereby keeping the reflectance of the highly reflective film 28a high.

Also, the moisture-proof base material 33 is made of polyphenylene sulfide or polyvinylidene fluoride which has relatively low moisture absorption, and thus moisture penetration into the heat-embossed layer 28 can be effectively prevented.

Second Embodiment

Figure 6:
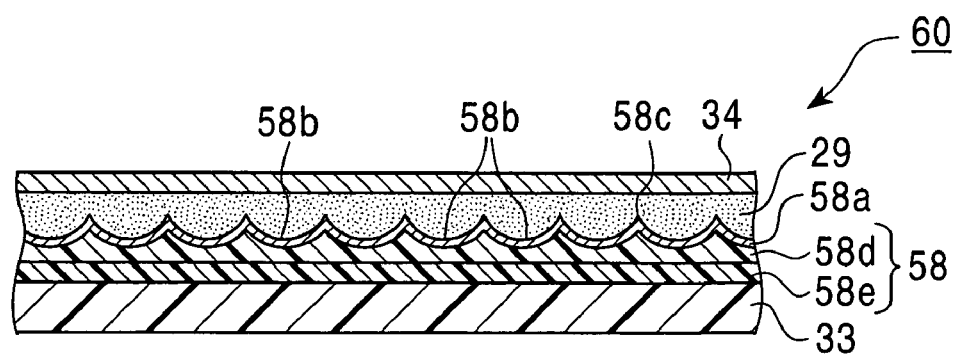
FIG. 6 is a schematic sectional view showing a reflector according to a second embodiment of the present invention.

FIG. 6 is a schematic sectional view of a reflector 60 according to a second embodiment of the present invention. Of the components of the reflector 60 shown in FIG. 6, the same components as those of the reflector 30 of the first embodiment shown in FIGS. 2 and 3 are denoted by the same reference numerals, and the description thereof is omitted.

As shown in FIG. 6, the reflector 60 of this embodiment comprises a heat-embossed layer 58 having a reflective surface 58c having a plurality of recesses 58b, a highly reflective film 58a laminated on the heat-embossed layer 58 to form the reflective surface 58c, and the moisture-proof base material 33 laminated on the opposite side of the heat-embossed layer 58 to the reflective surface 58c. Also, the adhesive layer 29 is laminated on the highly reflective film 58a.

As shown in FIG. 6, the surface shape of the heat-embossed layer 58 including the recesses 58b is reflected in the shape of the highly reflective film 58a to form an irregular surface on the highly reflective film 58a, the irregular surface of the highly reflective film 58a functioning as the reflective surface 58c. Each of the recesses 58b is preferably has a substantially spherical shape or an asymmetrically spherical shape. The material and thickness of the highly reflective film 58a are the same as the highly reflective film 28a of the first embodiment.

The heat-embossed layer 58 comprises a lamination of a processed resin layer 58d disposed in contact with the reflective surface 58c and having the recesses 58b, and a support resin layer 58e disposed in contact with the moisture-proof base material 33 and having a higher glass transition temperature than that of the processes resin layer 58d.

The processed resin layer 58d is made of a material having a lower glass transition temperature than that of the support resin layer 58e, and is preferably made of, for example, polycarbonate, ARTON, or the like. The processed resin layer 58d has a glass transition temperature in the range of 100° C. to 220° C. and has the property that the moisture absorption is high while processability is excellent because of its flexible molecular chain. Therefore, the recesses 58b can easily be formed in the surface by the heat embossing method described below.

The support resin layer 58e is made of a material having a higher glass transition temperature than that of the processed resin layer 58d, and is preferably made of, for example, polyphenylene sulfide, polyvinylidene fluoride, or the like. The support resin layer 58e has a glass transition temperature in the range of 120° C. to 280° C. and has the property that the moisture absorption is low while processability is poor because of its hard molecular chain. Therefore, a small amount of moisture permeated through the moisture-proof base material 33 can be completely cut off by the support resin layer 58e, thereby preventing moisture penetration into the processed resin layer 58d in contact with the highly reflective film 58a.

The thickness of the processed resin layer 58d is preferably in the range of 2 µm to 50 µm. A thickness of less than 2 µm is undesirable because the recesses 28b are made deep to deteriorate the reflection property, while a thickness of over 50 µm is undesirable because the total thickness of the reflector 60 is increased to fail to thin the liquid crystal display panel 20.

The thickness of the support resin layer 58e is preferably in the range of 50 µm to 100 µm. A thickness of less than 50 µm is undesirable because the effect of preventing moisture penetration into the processed resin layer 58d deteriorates, while a thickness of over 100 µm is undesirable because the total thickness of the reflector 60 is increased to fail to thin the liquid crystal display panel 20.

In addition to the same effect as that of the reflector 30 of the first embodiment, the reflector 60 of this embodiment has the effect below. Namely, the reflector 60 of this embodiment comprises the support resin layer 58e having a high glass transition temperature and disposed in contact with the moisture-proof base material 33, and thus moisture penetration into the processed resin layer 58d can be prevented to prevent the oxidation of the highly reflective film 58a, thereby maintaining the reflectance of the reflector 60 high. Also, the processed resin layer 58d having a lower glass transition temperature than that of the support resin layer 58e and excellent processability is disposed in contact with the reflective surface 58c, and thus the recesses 58b can be easily formed in the reflective surface 58c to form the reflector 60 having the excellent reflection property.

Third Embodiment

Figure 7:
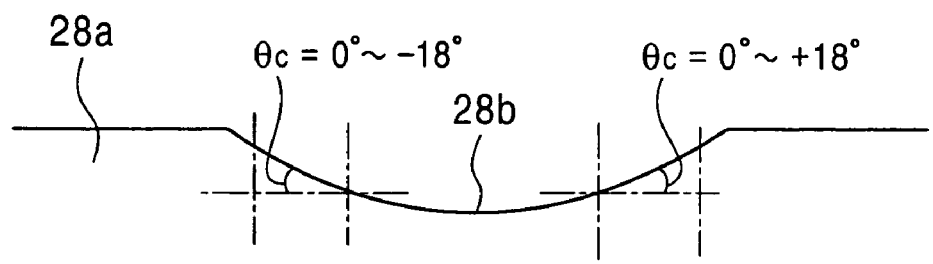
FIG. 7 is a schematic sectional view showing the outline of a recess provided in a reflector according to a third embodiment of the present invention.

A reflector according to a third embodiment of the present invention will be described below with reference to FIG. 7. FIG. 7 is a schematic sectional view showing a recess of the reflector according to the third embodiment. The reflector of this embodiment has the same construction as that of the reflector 30 of the first embodiment shown in FIGS. 2, 3 and 4 except the construction of the recess shown in FIG. 7.

The reflector of this embodiment has the reflection characteristic that a reflection luminance distribution is substantially symmetric with the regular reflection angle of incident light as a center. In order to achieve such a reflection characteristic, the reflector of this embodiment comprises the recesses 28b each having an inner surface shape formed under the control described below.

As shown in FIG. 7, the recesses 28b of the reflector of this embodiment are formed with random depths in the range of 0.1 µm to 3 µm, random pitches of the adjacent recesses 28b in the range of 5 µm to 100 µm, and inclination angles of the inner surfaces in the range of −18° to +18°.

In this embodiment, "the depth of the recess 28b" represents the distance from a portion of the reflective film surface where the recess is not formed to the bottom of the recess 28b, and "the pitch of the adjacent recesses 28b" represents the center-to-center distance between the circular planar shapes of the recesses 28b. Also, "the inclination angle of the inner surface of the recess" represents the angle $\theta_c$ with a horizontal surface (the surface of the reflective film) within a micro range of a width of 0.5 μm at any desired position of the inner surface of each recess 28b, as shown in FIG. 7. The positive and negative signs of the angle $\theta_c$ are defined as, for example, rightward inclination and leftward inclination, respectively, in FIG. 7 with respect to a line normal to the surface of the reflective film where the recesses 28b are not formed.

In this embodiment, it is particularly important that the inclination angle distribution of the inner surfaces of the recesses 28b is set in the range of −18° to +18°, and that the pitch of the adjacent recesses 28b is randomly set in all planar directions. This is because if the pitch of the adjacent recesses 28b has regularity, an interference color of light occurs to cause the problem of coloring reflected light. If the inclination angle distribution of the inner surfaces of the recesses 28b is beyond the range of −18° to +18°, the diffusion angle of reflected light excessively widens to decrease reflection strength, thereby failing to obtain a bright display (the diffusion angle of reflected light in air is 55° or more).

When the depth of the recesses 28b is less than 0.1 μm, the light diffusing effect cannot be sufficiently achieved by the recesses formed in the reflective surface, while when the depth of the recesses 28b exceeds 3 μm, the pitch must be increased for attaining the sufficient light diffusing effect to possibly cause moiré fringes.

Furthermore, when the pitch of the adjacent recesses 28b is less than 5 μm, the production of a mother die used for forming a heat-embossed resin plate is limited to cause the problem of significantly increasing the processing time, failing to form a shape for achieving the desired reflection property, and producing light interference. The pitch of the adjacent recesses 28b is preferably 5 μm to 100 μm.

Figure 8:
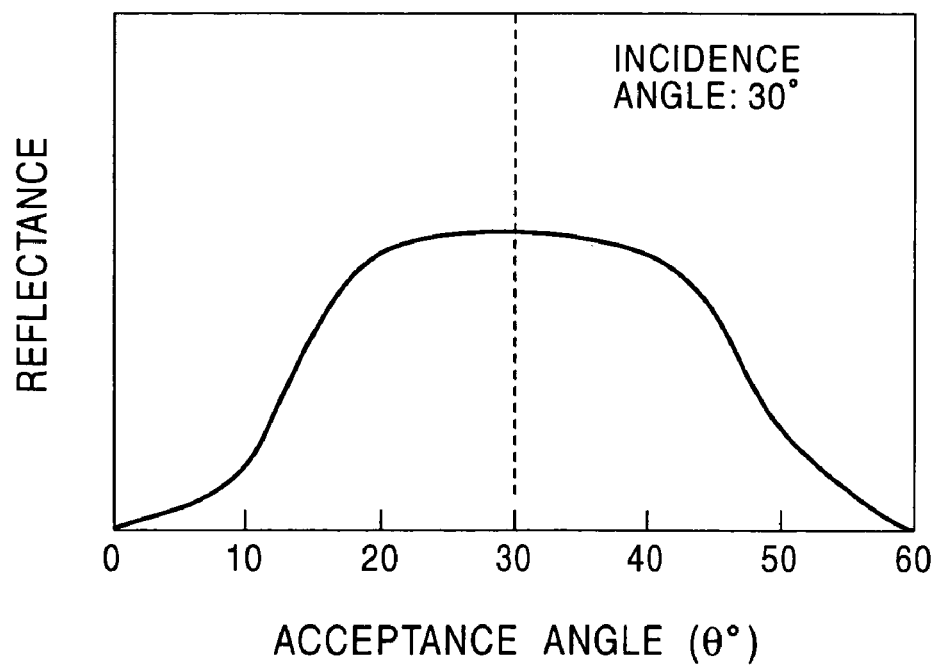
FIG. 8 is a graph showing the reflection property of the reflector shown in FIG. 7.

FIG. 8 shows the relationship between the acceptance angle (θ°) and brightness (reflectance, unit: %) of the reflector of this embodiment determined by the same method as in the first embodiment. This figure indicates that substantially equal reflectance is obtained in a symmetrical wide range of acceptance angles with the regular reflection direction as a center. Particularly, the reflectance is substantially constant in an acceptance angle range of ±10° with the regular reflection direction as a center. This suggests that a display with substantially same brightness can be obtained in all viewing directions within the above range of viewing angle.

In this way, the depth and pitch of the recesses 28b are controlled in the above ranges, and the inner surface of each recess 28b comprises a part of a spherical surface, so that the reflectance can be made substantially constant in a symmetrical wide range of acceptance angles with the regular reflection direction as a center. Namely, the depth and pitch of the recesses 28b are controlled so that the inclination angles of the inner surfaces of the recesses 28b, which determine a reflection angle, are controlled in the predetermined range, and thus the reflection efficiency of the reflective film can be controlled in a predetermined range. Also, the inner surface of each recess 28b is a spherical surface symmetrical in all directions, and thus equal reflectance can be obtained in a wide range of reflection directions of the reflective film.

Fourth Embodiment

Figure 9:
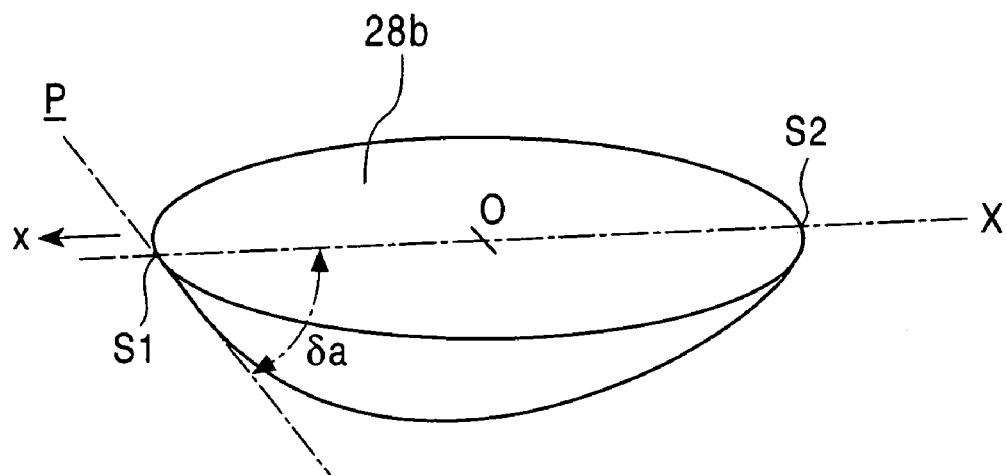
FIG. 9 is a schematic perspective view showing the outline of a recess provided in a reflector according to a fourth embodiment of the present invention.
Figure 10:
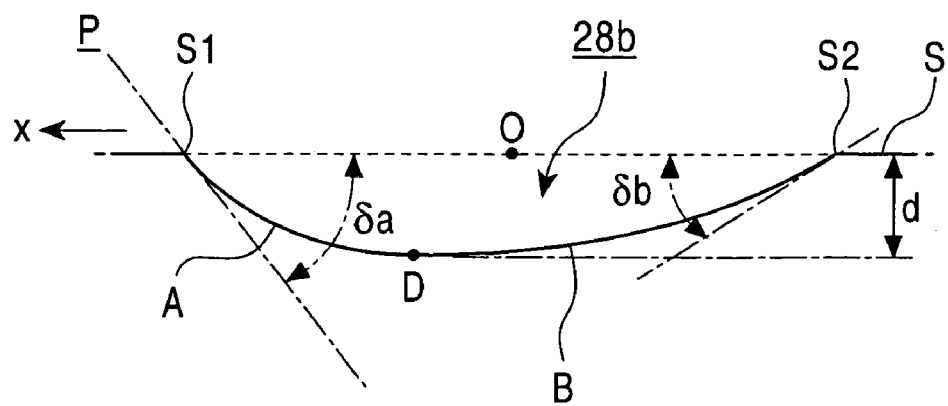
FIG. 10 is a schematic sectional view showing the outline of the recess provided in the reflector according to the fourth embodiment of the present invention.

A reflector according to a fourth embodiment of the present invention will be described below with reference to FIGS. 9 and 10. FIG. 9 is a schematic perspective view of a recess of the reflector of this embodiment, and FIG. 10 is a schematic sectional view of the recess of the reflector shown in FIG. 9. The construction of the reflector of this embodiment is the same as that of the reflector 30 of the first embodiment shown in FIGS. 2, 3 and 4 except the construction of the recess shown in FIGS. 9 and 10.

The reflector of this embodiment has the reflection characteristic that a reflection luminance distribution is substantially symmetric with the regular reflection angle of incident light as a center. In order to achieve such a reflection characteristic, the reflector of this embodiment comprises the recesses 28b each having an inner surface shape formed under the control described below.

In addition to being used as a reflector having the reflection characteristic that the reflection luminance distribution is substantially symmetric with the regular reflection direction as a center, the reflector of this embodiment can be used as a reflector having the reflection characteristic that the reflection luminance distribution is asymmetric with respect to the regular reflection direction. FIGS. 9 and 10 show one of the many recesses 28b formed in the reflector of this embodiment exhibiting a reflection luminance distribution asymmetric with respect to the regular reflection direction. In a specified longitudinal section X of the recess 28b shown in FIG. 9, the inner surface shape of the recess 28b comprises a first curve A extending from a peripheral edge S1 of the recess 28b to the vertex D, and a second curve B continued from the first curve A and extending from the vertex D of the recess 28b to the other peripheral edge S2. Both curves A and B have inclination angles of zero with the surface S of the reflective film at the vertex D, and are connected together.

"The inclination angle" represents the angle of a tangent line with a horizontal surface (a portion of the reflective film surface S where the recess 28b is not formed) at any desired position of the inner surface of the recess 28b in the specified longitudinal section.

The inclination angle of the first curve A with the reflective film surface S is larger than that of the second curve B, and the vertex D is shifted from the center O of the recess 28b in the X direction. Namely, the average absolute value of the inclination angle of the first curve A with the reflective film surface S is larger than that of the second curve B with the reflective film surface S. In the plurality of the recesses 28b formed in the surface of the reflector, the inclination angles of the first curves A with the reflective film surface S irregularly vary in the range of 1° to 89°. Also, the average absolute values of the inclination angles of the second curves B of the recesses 28b irregularly vary in the range of 0.5° to 88°.

The inclination angles of both curves gently change, and thus the maximum inclination angle δa (absolute value) of the first curves A is larger than the maximum inclination angle δb (absolute value) of the second curves B. The vertex D at the connection between the first curve A and the second curve B has an inclination angle of zero with the surface of the base material, and thus the first curve A having a negative inclination angle is smoothly connected to the second curve B having a positive inclination angle.

Although the maximum inclination angles δa of the plurality of the recesses 28b formed in the surface of the reflective film irregularly vary in the range of 2° to 90°, the maximum inclination angles δa of many of the recesses 28b irregularly vary in the range of 4° to 35°.

The inner surface of each of the recesses 28b has a single vertex D (a point on the curved surface with an inclination angle of zero). The distance between the vertex D and the reflective film surface S of the base material corresponds to the depth d, and the depths d of the plurality of the recesses 28b irregularly vary in the range of 0.1 μm to 3 μm.

In this embodiment, the specified longitudinal sections X of the plurality of the recesses 28b are in the same direction, and the first curves A of the respective recesses 28b are oriented in a single direction. Namely, in all of the recesses 28b, the X directions shown by an arrow in FIGS. 9 and 10 are in the same direction.

In the reflector having the above construction, the first curves A of the plurality of the recesses 28b are oriented in a single direction, and thus reflected light of light incident obliquely from above in the X direction (the first curve A side) shown in FIG. 10 is shifted to the line normal to the reflective film surface S from the regular reflection direction.

Conversely, reflected light of light incident obliquely from above in the direction (the second curve B side) opposite to the X direction shown in FIG. 10 is shifted to the surface side of the reflective film surface S from the regular reflection direction.

Therefore, the specified longitudinal section X has the synthetic reflection characteristic that reflectance is increased in the direction of reflection by the peripheral surfaces of the second curves B, and thus the reflection characteristic that the reflection efficiency is selectively improved in a specified direction can be attained.

Figure 11:
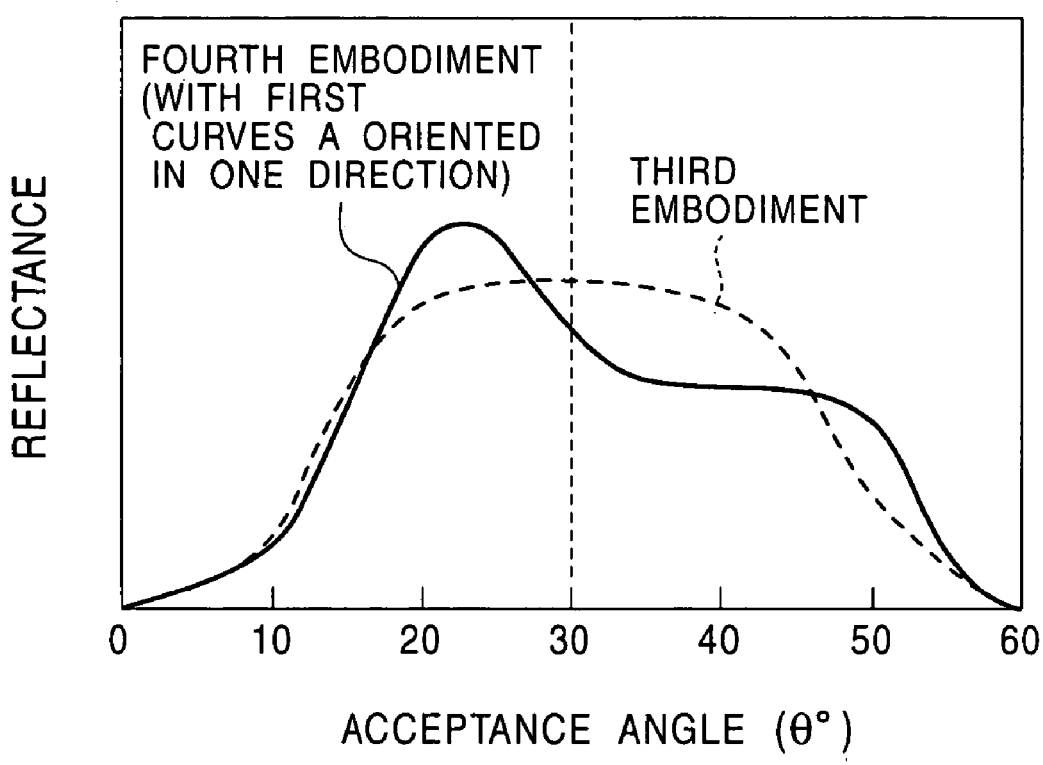
FIG. 11 is a graph showing the reflection property of the reflector shown in FIGS. 9 and 10.

FIG. 11 shows the relationship between the acceptance angle (θ°) and brightness (reflectance, unit: %) of the reflector of this embodiment determined by the same method as in the first embodiment. FIG. 11 also shows the relationship between the acceptance angle and reflectance of the reflector comprising the recesses 28b (third embodiment) each having the sectional shape shown in FIG. 7. FIG. 11 indicates that reflectance becomes maximum at a reflection angle smaller than a reflection angle of 30° in the regular reflection direction with the incidence angle of 30° in this embodiment, and the reflectance is also increased in the vicinity of the maximum as a peak.

Therefore, in the reflector of this embodiment, each of the recesses 28b constituting the reflective surface has the above-described shape, and thus light emitted from an illuminating light source can be effectively reflected and scattered. Also, the light reflected by the reflector has the directivity that reflectance is increased in a specified direction. Thus, the emission angle of the reflected light emitted through the reflector is widened, and the emission efficiency can be improved at a specified emission angle.

Fifth Embodiment

Figure 12:
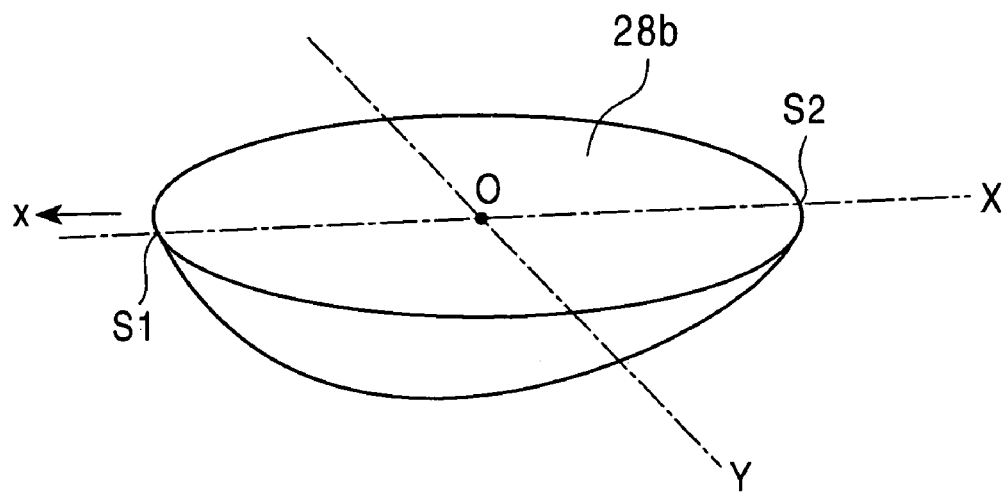
FIG. 12 is a schematic perspective view showing the outline of a recess provided in a reflector according to a fifth embodiment of the present invention.
Figure 13:
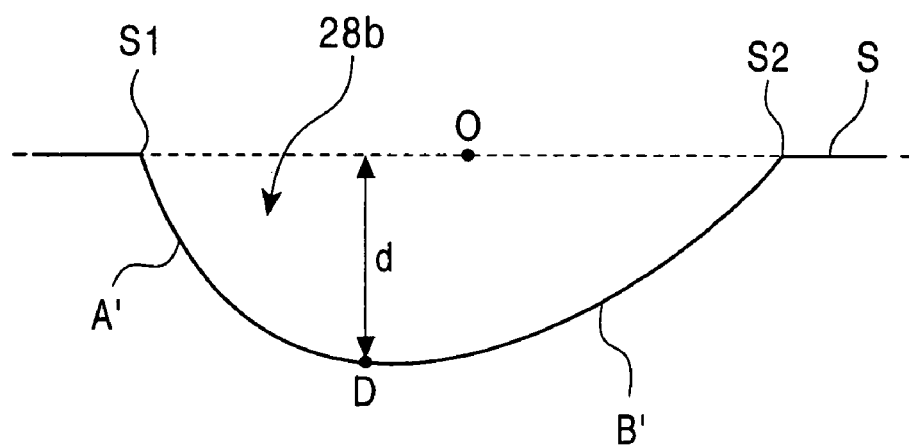
FIG. 13 is a schematic sectional view showing the outline of the recess provided in the reflector according to the fifth embodiment of the present invention.
Figure 14:
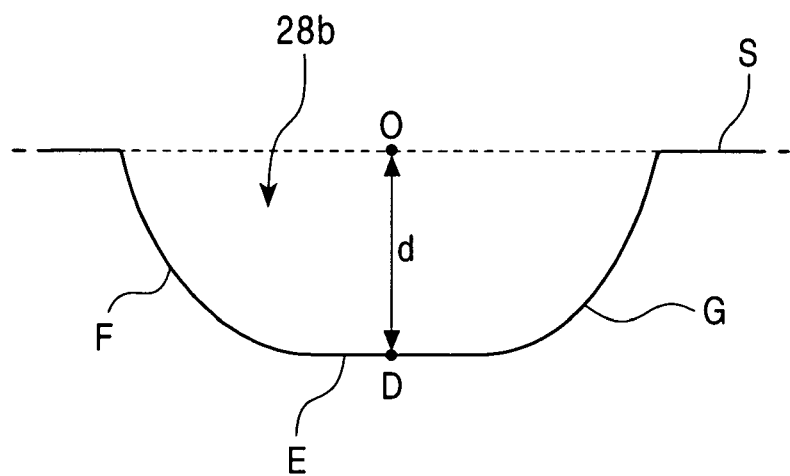
FIG. 14 is a schematic sectional view showing the outline of the recess provided in the reflector according to the fifth embodiment of the present invention.

A reflector according to a fifth embodiment of the present invention will be described below with reference to FIGS. 12 to 14. FIG. 12 is a schematic perspective view of one of recesses 28b of the reflector of this embodiment, FIG. 13 is a schematic sectional view (referred to as a "longitudinal section X") taken along the X axis of the recess 28 of the reflector, and FIG. 14 is a schematic sectional view (referred to as a "longitudinal section Y") taken along the Y axis perpendicular to the X axis of the recess 28 of the reflector. The construction of the reflector of this embodiment is the same as that of the reflector 30 of the first embodiment shown in FIGS. 2, 3 and 4 except the construction of the recess shown in FIGS. 12 to 14.

As shown in FIGS. 12 and 13, the inner surface shape in the longitudinal section X of the recess 28b comprises a first curve A' extending from a peripheral edge S1 of the recess 28b to the vertex D, and a second curve B' extending from the vertex D of the recess 28b to the other peripheral edge S2. In FIG. 13, the downward-sloping curve A' and the upward-sloping curve B' have inclination angles of zero with the surface S of the reflective film at the vertex D, and are gently connected together. The "inclination angle" has the same definition as in the fourth embodiment.

The inclination angle of the first curve A' with the reflective film surface S is larger than that of the second curve B', and the vertex D is shifted from the center O of the recess 28b in the direction (X direction) to the periphery along the X axis. Namely, the average absolute value of the inclination angle of the first curve A' is larger than that of the second curve B'. In the plurality of the recesses 28b formed in the surface of the reflector, the average absolute values of the inclination angles of the first curves A' irregularly vary in the range of 2° to 90°, and the average absolute values of the inclination angles of the second curves B' of the recesses 28b irregularly vary in the range of 1° to 89°.

On the other hand, as shown in FIG. 14, the inner surface shape in the longitudinal section Y of the recess 28b is substantially symmetrical with the center O of the recess 28b, and the vicinity of the vertex D of the recess 28b has a large radius of curvature, i.e., has a gentle curve E close to a straight line. Also, steep curves F and G each having a small radius of curvature are formed on both sides of the gentle curve E. In each of the plurality of the recesses 28b formed in the surface of the reflector, the absolute value of the inclination angle of the gentle curve E is about 10° or less. The absolute values of the inclination angles of the steep curves F and G of the plurality of the recesses 28b irregularly vary, for example, in the range of 2° to 90°. The depths of the vertexes D also irregularly vary in the range of 0.1 μm to 3 μm.

In this embodiment, the specified longitudinal sections X of the plurality of the recesses 28b formed in the surface of the reflector are taken along the same direction, and the specified longitudinal sections Y are also taken along the same direction. Furthermore, the directions of the first curves A' extending from the vertexes D to the peripheries S1 are the same direction. Namely, all of the recesses 28b formed in the surface of the reflecting layer are formed in such a manner that the X directions shown by an arrow in FIG. 12 are the same.

In this embodiment, the recesses 28b formed in the surface of the reflector are oriented in the same direction, and the directions of the first curves A' from the vertexes D to the peripheries S1 are same. Therefore, in the reflector, reflected light of light incident obliquely from above in the X direction (the first curve A' side) shown in FIG. 12 is shifted to the line normal to the reflective film surface S from the regular reflection direction.

Conversely, reflected light of light incident obliquely from above in the direction (the second curve B' side) opposite to the X direction shown in FIG. 12 is shifted to the surface side of the reflective film surface S from the regular reflection direction.

Furthermore, each of the longitudinal sections Y perpendicular to the longitudinal sections X has the gentle curve E having a large radius of curvature, and the steep curves F and G having a small radius of curvature and formed on both sides of the gentle curve E, and thus the reflectance of the reflective surface of the reflector can also be increased in the regular reflection direction.

Figure 15:
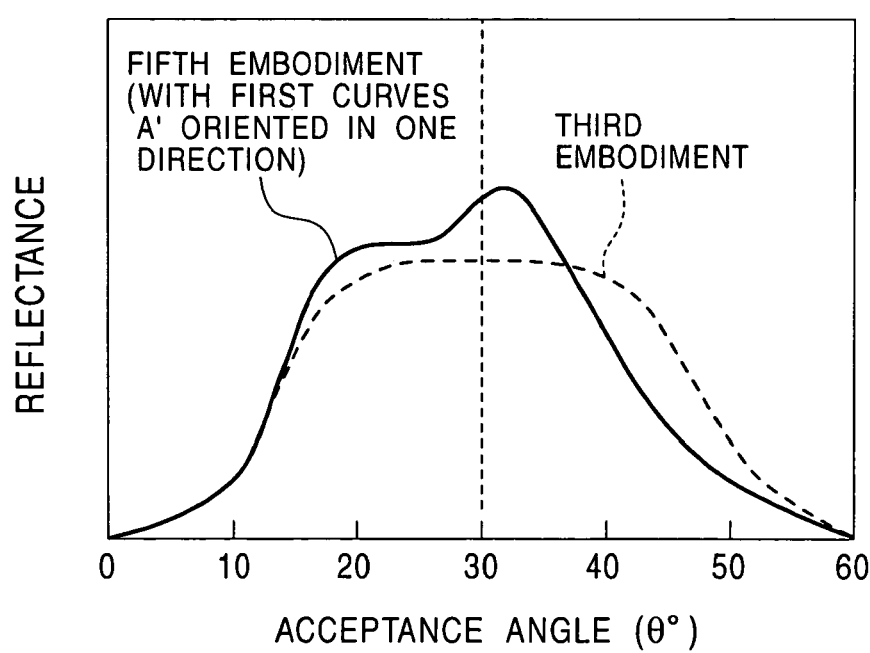
FIG. 15 is a graph showing the reflection property of the reflector shown in FIGS. 12 to 14.

As a result, as shown in FIG. 15, the longitudinal section X has the synthetic reflection characteristic that reflected light is properly concentrated in a specified direction while sufficiently maintaining reflectance in the regular reflection direction. FIG. 15 shows the relationship between the acceptance angle ($\theta°$) and brightness (reflectance, unit: %) of the reflector of this embodiment determined by the same method as in the first embodiment. The graph of FIG. 15 shows the reflection characteristic that the integrated reflectance value in a reflection angle range smaller than a regular reflection angle of 30° is greater than that in a reflection angle range larger than the regular reflection angle, and the reflection direction is liable to be shifted to the normal line from the regular reflection direction.

Therefore, in the reflector having the above construction, each of the recesses 28b has the above-described shape, and thus incident light can be effectively reflected and scattered, and the light reflected by the reflector has the directivity that reflectance is increased in a specified direction. Thus, the emission angle of the reflected light emitted through the reflector is widened, and the emission efficiency can be improved at a specified emission angle.

Sixth Embodiment

Figure 16A:
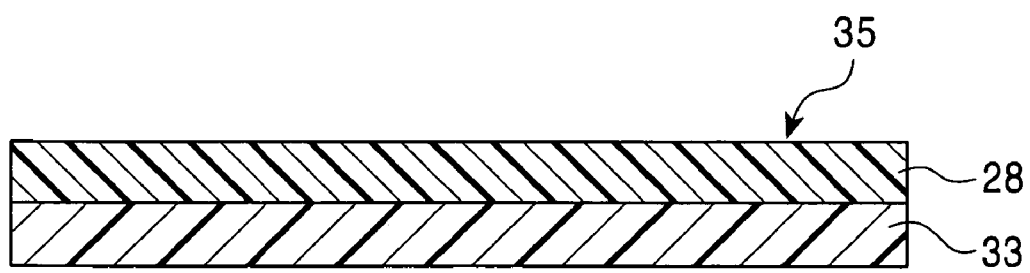
FIG. 16A is a drawing illustrating a material that is to be embossed.

A method for producing the reflector 30 of the first embodiment and a method for attaching the reflector 30 to the liquid crystal display panel 20 will be described below with reference to FIGS. 16 to 17. The production method described below can be applied to the reflector of any one of the second to fifth embodiments. First, as shown in FIG. 16A, a material 35 to be embossed is prepared. The material 35 to be embossed comprises a lamination of a layer 28 to be heat-embossed and a moisture-proof base material 33.

Figure 16B:
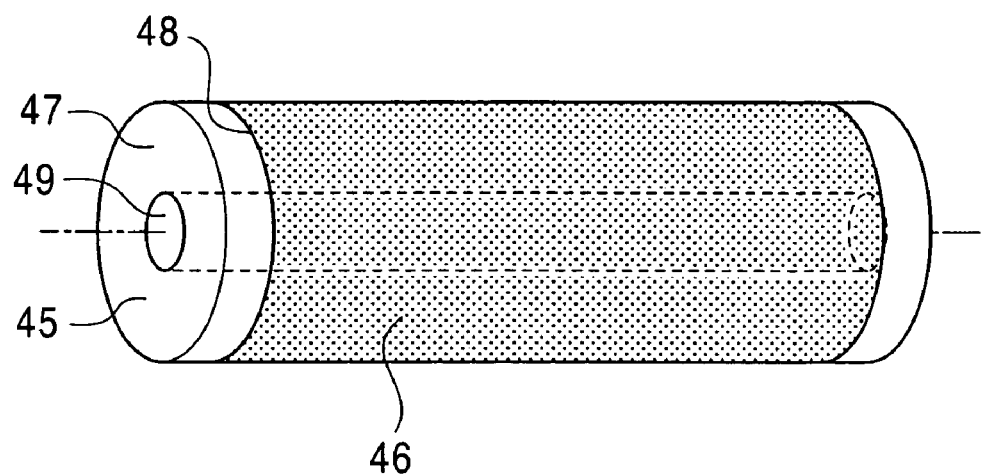
FIG. 16B is a drawing illustrating a mother die for embossing the material.

Next, as shown in FIG. 16B, an embossing mother die 45 is prepared for forming a reflective surface with irregularities on the layer 28 to be heat-embossed. The embossing mother die 45 comprises a cylindrical member having a peripheral processing region 46 where many micro protrusions are formed, and includes an embossing roll 47 and an electroforming mold 48 composed of Ni and wound on the periphery of the embossing roll 47. The processing region 46 is formed in the surface of the electroforming mold 48 and has the micro protrusions formed thereon. The shape of the protrusions corresponds to the recess 28b shown in FIGS. 2, 3 and 4. Also, a rod-shape heater 49 is provided at the axial center of the embossing mother die 45 so that the surface (processing region 46) of the electroforming mold 48 can be heated to a temperature of about 200° C. by the heater 49.

Figure 17A:
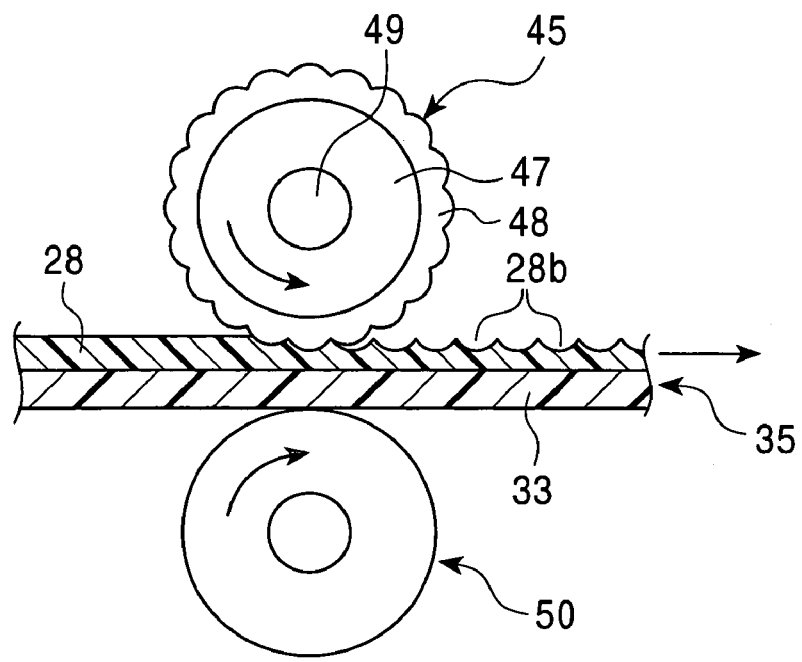
FIG. 17A is a drawing illustrating embossing the material with the mother die.

Next, as shown in FIG. 17A, the surface shape of the embossing mother die 45 shown in FIG. 16B is transferred to the layer 28 to be heat-embossed by embossing. In this step, the embossing mother die 45 is disposed to be axially parallel to a receiving roller 50 in the vertical direction. The material 35 as a workpiece to be embossed can be passed through the space between the embossing mother die 45 and the receiving roller 50. Furthermore, a means for synchronizing rotation and movement may be provided between the embossing mother die 45 and the material 35 to be embossed, for preventing slipping of the embossing mother die 45.

In the step shown in FIG. 17A, the embossing mother die 45 and the receiving roller 50 are rotated, and at the same time, the material 35 to be embossed is inserted between the embossing mother die 45 and the receiving roller 50 and moved to the rightward direction in FIG. 17A under a condition in which the surface of the embossing mother roller 45 is maintained at about 200° C. by the heater 49. The layer 28 to be heat-embossed of the material 35 to be embossed is pressed on the surface of the embossing mother die 45 to emboss the surface shape of the embossing mother die 45 on the layer 28 to be heat-embossed, thereby forming many recessed 28b on the surface of the heat-embossed layer 28. When the layer 28 to be heat-embossed is pressed on the heated embossing mother die 45, the temperature of the layer 28 to be heat-embossed is increased and softened, thereby easily transferring the shape of the embossing mother die 45 by embossing. The heat-embossed layer 28 passed through the embossing mother die 45 is rapidly cured by cooling with the surrounding atmosphere to maintain the shapes of the recessed 28b.

In the above-described steps, the recesses 28b having the shape opposite to that of the embossing mother die 45 can be formed in the surface of the heat-embossed layer 28.

Figure 17B:
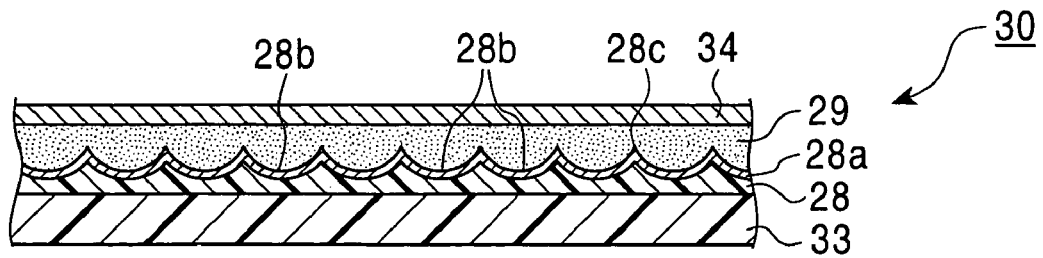
FIG. 17B is a drawing illustrating a highly reflective film, an adhesive layer and a protecting material laminated to a heat-embossed layer of the material.
Figure 18:
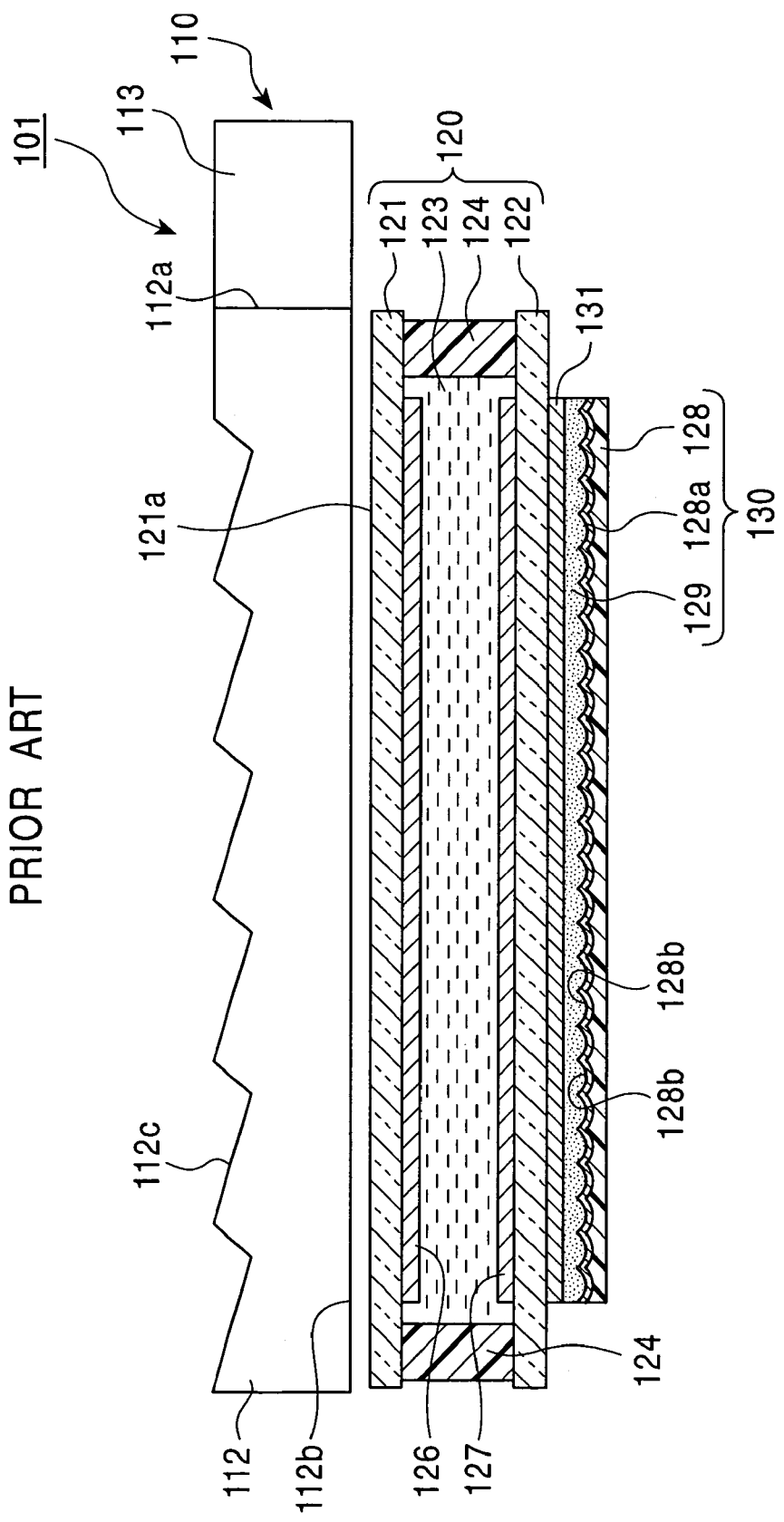
FIG. 18 is a schematic sectional view of a conventional liquid crystal display device.

Finally, as shown in FIG. 17B, a highly reflective film 28a, an adhesive layer 29 and a protecting material 34 are laminated in that order on the heat-embossed layer 28 having the recesses 28b formed thereon to obtain the reflector 30 of the first embodiment.

The thus-obtained reflector 30 is attached to the outer surface 22b of the second substrate 22 of the liquid crystal display panel 20 shown in FIG. 1. The reflector 30 is attached by a method in which the protecting material 34 for protecting the adhesive layer 29 is removed to expose the adhesive layer 29, and then the adhesive layer 29 is bonded to the outer surface 22b of the second substrate 22.

The front light 10 is further disposed on the display surface side 21a of the liquid crystal display panel 20 to obtain the liquid crystal display device shown in FIG. 1.

The technical scope of the present invention is not limited to the above embodiments, and various changes can be made within the scope of the gist of the present invention. Namely, the present invention may be applied to a transflective liquid crystal display device instead of the reflective liquid crystal display device of this embodiment. In this case, a retardation plate and a polarization plate are disposed below the heat-embossed layer 28 shown in FIG. 1, and a back light is disposed outside the reflector instead of the front light. Furthermore, many holes may be formed in the highly reflective film 28a to transmit illuminating light from the back light.

EXAMPLES

Example 1

A layer to be heat-embossed having a thickness of 100 μm and made of polycarbonate, and a moisture-proof base material having a thickness of 100 μm and made of polyphenylene sulfide were laminated to prepare a material to be embossed. Next, the embossing mother die 45 shown in FIG. 16B was prepared. The embossing mother die 45 comprised a cylindrical member having a peripheral processing region where many micro protrusions were formed. Next, the surface shape of the embossing mother die was transferred to the layer to be heat-embossed by embossing in the same step as that shown in FIG. 17A to form recesses opposite to the protrusions of the embossing mother die on the surface of the heat-embossed layer.

Furthermore, a highly reflective film made of Al and having a thickness of 12 nm was deposited on the surface of the heat-embossed layer by evaporation, and an adhesive layer and a protecting material were further laminated on the highly reflective film to obtain a reflector of Example 1 having substantially the same construction as that of the reflector shown in FIGS. 2 and 3. The reflector of Example 1 was bonded to the same liquid crystal display panel as in FIG. 1 to form a reflective liquid crystal display panel.

Comparative Example 1

A reflector of Comparative Example 1 was obtained by the same method as in Example 1 except that a polycarbonate substrate having a thickness of 100 µm was used as a material to be embossed. The reflector of Comparative Example 1 was bonded to the same liquid crystal display panel as in FIG. 1 to form a reflective liquid crystal display panel.

Each of the liquid crystal display panels of Example 1 and Comparative Example 1 was allowed to stand in a constant-temperature-constant-humidity bath adjusted to 60° C. and 92% RH for 1000 hours. As a result of observation of each reflector after standing, the reflector of Comparative Example 1 was made substantially transparent due to oxidation of the highly reflective film made of Al, and thus exhibited no reflection property. On the other hand, the reflector of Example 1 showed little oxidation of the highly reflective film and no deterioration in reflectance after standing.

Seventh Embodiment

Figure 19:
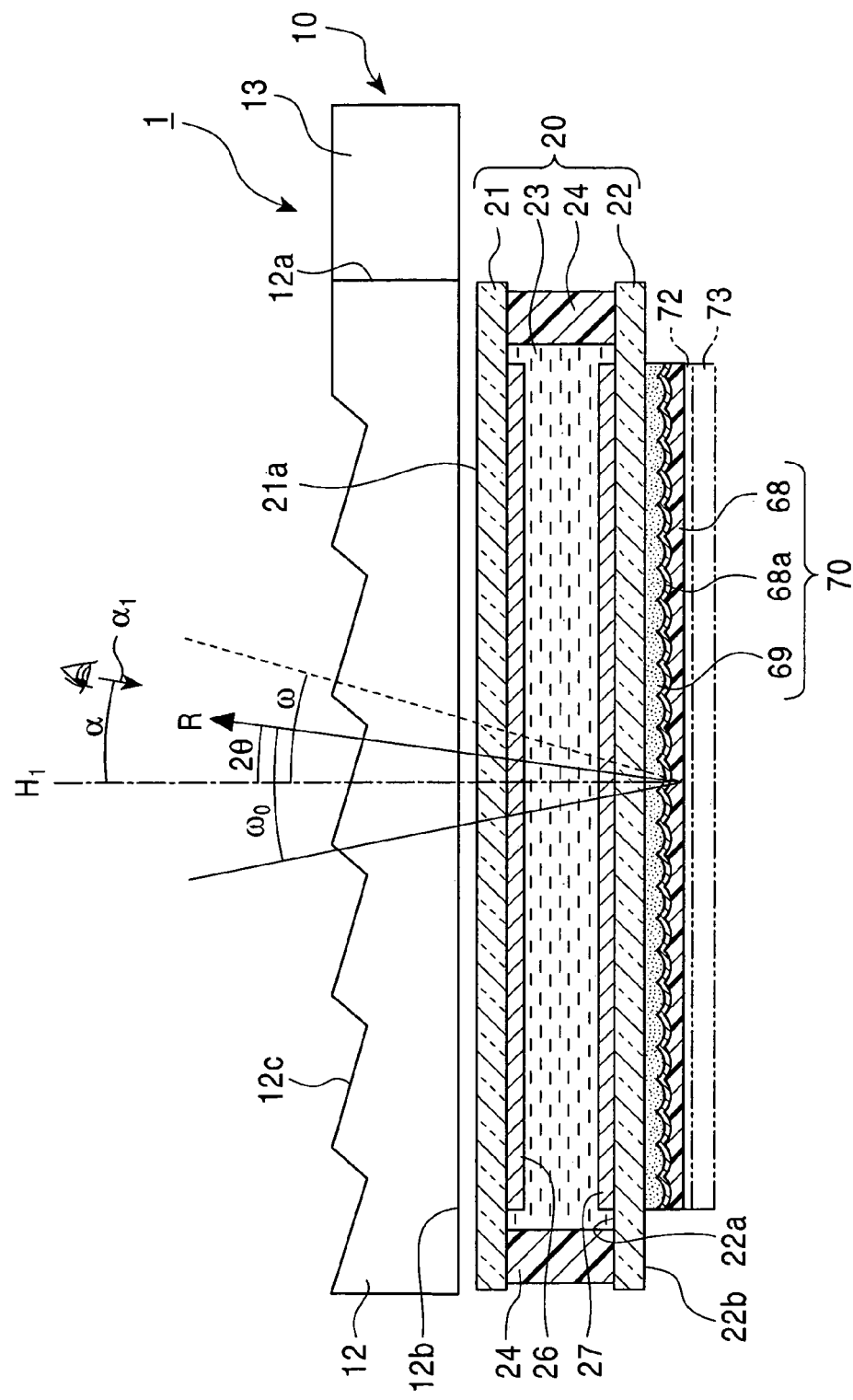
FIG. 19 is a schematic sectional view of a liquid crystal display device according to a seventh embodiment of the present invention.
Figure 20:
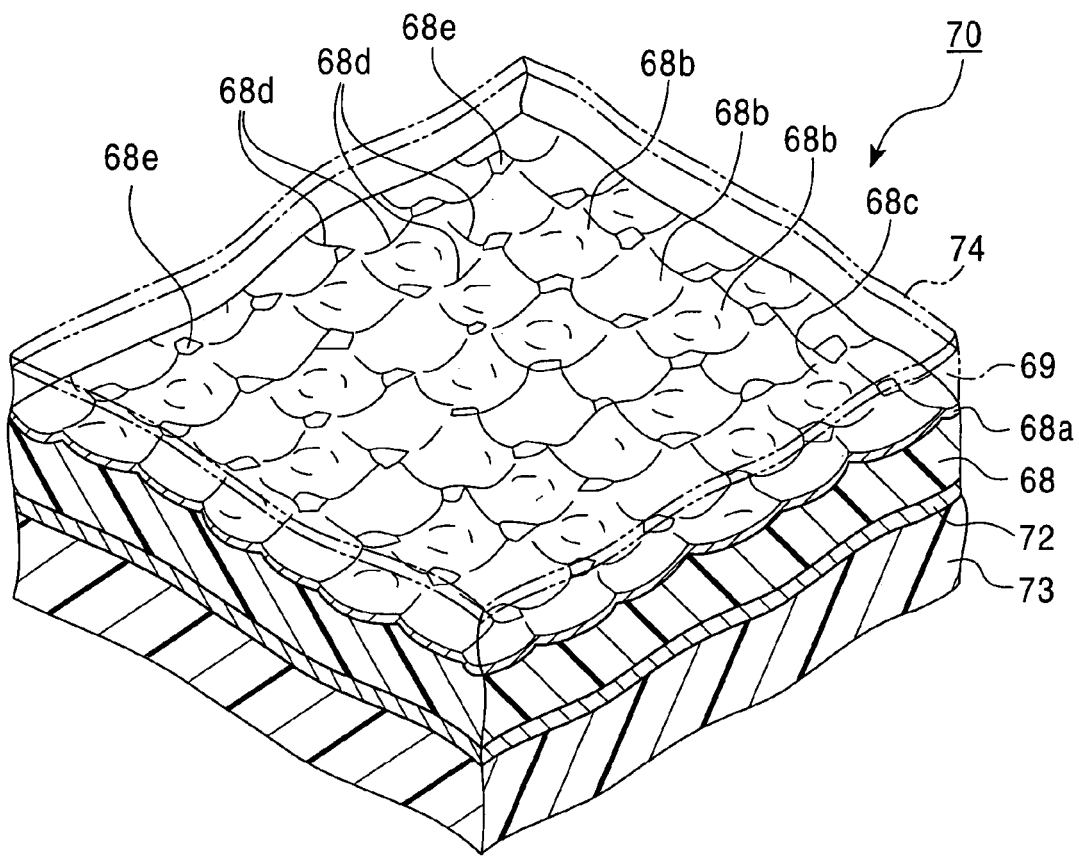
FIG. 20 is a perspective view showing a reflector before mounting on a liquid crystal display device.
Figure 21:
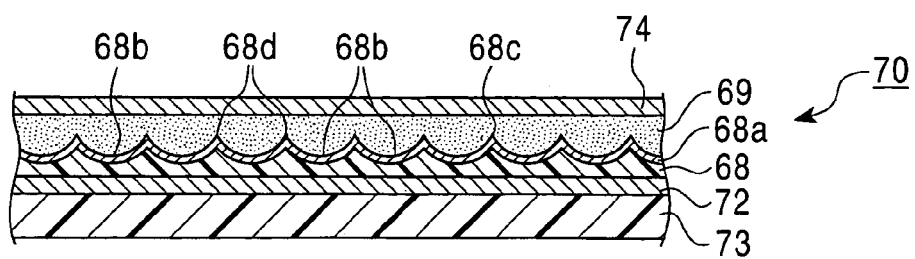
FIG. 21 is a schematic sectional view showing a reflector before mounting on a liquid crystal display device.

FIG. 19 is a schematic sectional view of a liquid crystal display device of this embodiment, FIG. 20 is a schematic perspective view of a reflector provided on the liquid crystal display device, and FIG. 21 is a schematic sectional view of the reflector. As shown in FIG. 19, the liquid crystal display device of this embodiment is a reflective type and roughly comprises a liquid crystal display panel 20, and a front light 10 disposed on the observation side of the liquid crystal display panel 20. Of the components of the reflector and the liquid crystal display panel, the same components as those in the first embodiment shown in FIGS. 1 to 3 are denoted by the same reference numerals, and the description thereof is omitted.

As shown in FIG. 19, a reflector 70 is attached to the outer surface of the second substrate 22, i.e., the opposite outer surface 22b of the second substrate 22 to the liquid crystal layer-facing surface 22a.

As shown in FIGS. 20 and 21, the reflector 70 before attachment to the liquid crystal display panel 20 comprises a heat-embossed layer 68 made of, for example, a thermoplastic resin such as polycarbonate or the like, an adhesive layer 69 laminated on the heat-embossed layer 68, a protecting material 74 provided on the adhesive layer 69, a separating layer 72 laminated on the opposite side of the heat-embossed layer 68 to the reflective surface 68c, and an embossed base 73 which can be separated from the heat-embossed layer 68 by the separating layer 72. In mounting the reflector 70 on the liquid crystal display panel 20, the protecting material 74 is removed, and the adhesive layer 69 is bonded to the second substrate 22, and at the same time, the separating layer 72 and the embossed base 73 are separated from the heat-embossed layer 68. Therefore, the separating layer 72 and the embossed base 73 are shown by one-dot chain lines in FIG. 19.

The present invention is not limited to the embodiment shown in FIG. 19, and the present invention includes a liquid crystal display panel in which the separating layer 72 and the embossed base 74 are mounted on the heat-embossed layer 68.

The heat-embossed layer 68 may be made of an ultraviolet curing resin having a predetermined thickness. In this case, during embossing, the die may be pressed under irradiation of ultraviolet rays.

As shown in FIGS. 19 to 21, like in the first embodiment, a plurality of recesses 68b are formed in the surface of the heat-embossed layer 68, and the highly reflective film 68a is formed on the recesses 68b.

The depth of each of the recesses 68b is about 0.1 µm to 3 µm, and the thickness of the heat-embossed layer 68 is set in the range of 1 µm to 1000 µm. With the heat-embossed layer 68 having a thickness of less than 1 µm, the recesses 68b cannot be easily formed by the embossing method described below, while with the heat-embossed layer 68 having a thickness of over 1000 µm, the total thickness of the reflector 70 is increased to undesirably make it impossible to thin the liquid crystal display panel 20.

Figure 22:
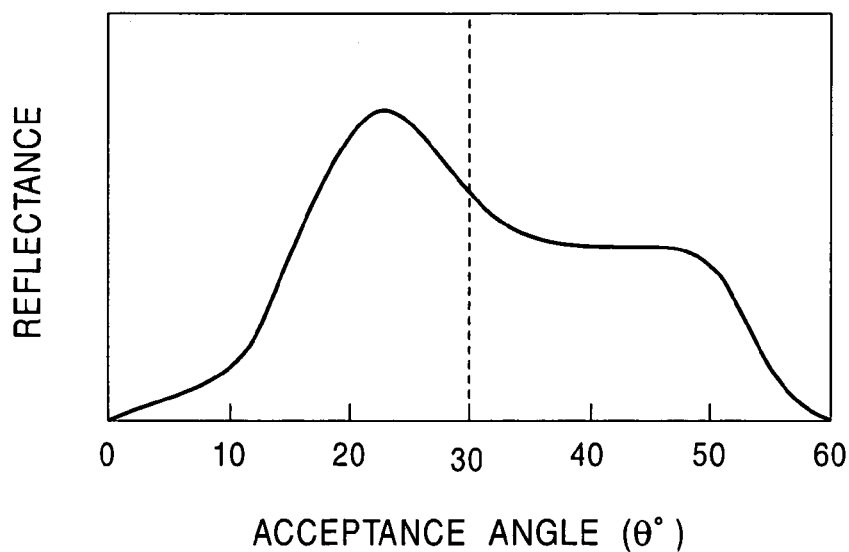
FIG. 22 is a graph showing the reflection property of the reflector according to the seventh embodiment of the present invention.

As shown in a graph of FIG. 22, the reflector of this embodiment can improve the reflection luminance of the liquid crystal display device 1 in the front direction and increase the luminance of the liquid crystal display device 1 in the observer direction.

The embossed base 73 preferably comprises a material having a higher glass transition temperature Tg than that of the heat-embossed layer 68, for example, polyethylene terephthalate (PET), or the like. Since the embossed base 73 has higher Tg, it has higher bending strength than that of the heat-embossed layer 68 and high hardness. Therefore, the embossed base 73 is laminated on the heat-embossed layer 68 through the separating layer 72 to securely support the heat-embossed layer 68. Thus, even when the heat-embossed layer 68 is heat-embossed, the heat-embossed layer 68 is neither divided nor broken.

The thickness of the embossed base 73 is preferably in the range of 0.05 mm to 1 mm. A thickness of less than 0.05 mm is undesirable because of deterioration in bending strength, and a difficulty in heat-embossing the heat-embossed base layer 68, while a thickness of over 1 mm is undesirable because of complexity in handling of the reflector 70.

The separating layer 72 facilitates the separation of the heat-embossed layer 68 from the embossed base 74, and is separated from the heat-embossed layer 68 together with the embossed base 74.

Furthermore, the adhesive layer 69 is the same as in the first embodiment, and the protecting material 74 functions to protect the adhesive layer 69 and maintain the adhesive force of the adhesive layer 59 until the reflector 70 is mounted on the liquid crystal display panel 20. Release paper can be used as the protecting material 74.

A method for producing the reflector 70 of this embodiment and a method for attaching the reflector 70 to the liquid crystal display panel 20 will be described with reference to FIGS. 23 to 25. In this embodiment, the same procedures as in the sixth embodiment are performed. Therefore, the same components as in the sixth embodiment shown in FIGS. 16 and 17 are denoted by the same reference numerals, and the description thereof is omitted.

Figure 23A:
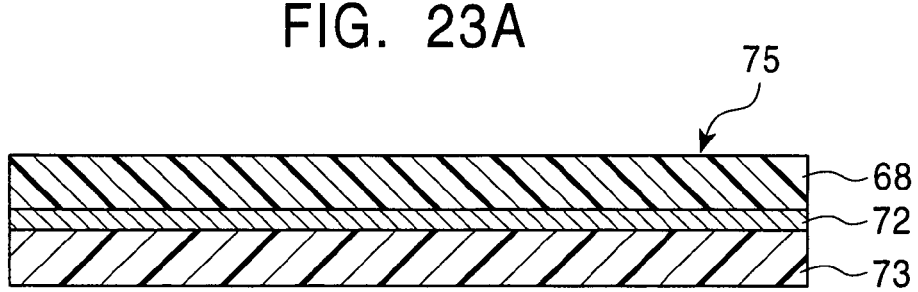
FIG. 23A is a drawing illustrating a material to be embossed in the seventh embodiment.

First, as shown in FIG. 23A, a material 75 to be embossed is prepared. The material 75 to be embossed comprises a lamination of a layer 68 to be heat-embossed, a separating layer 72, and a base material 73 to be embossed.

Figure 23B:
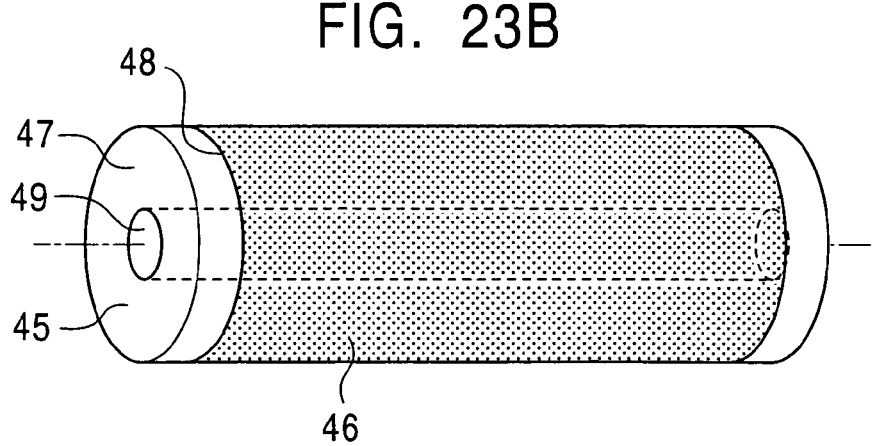
FIG. 23B is a drawing illustrating a mother die for embossing the material in the seventh embodiment.

Next, as shown in FIG. 23B, an embossing mother die 45 is prepared for forming a reflective surface with irregularities on the layer 68 to be heat-embossed.

Figure 24A:
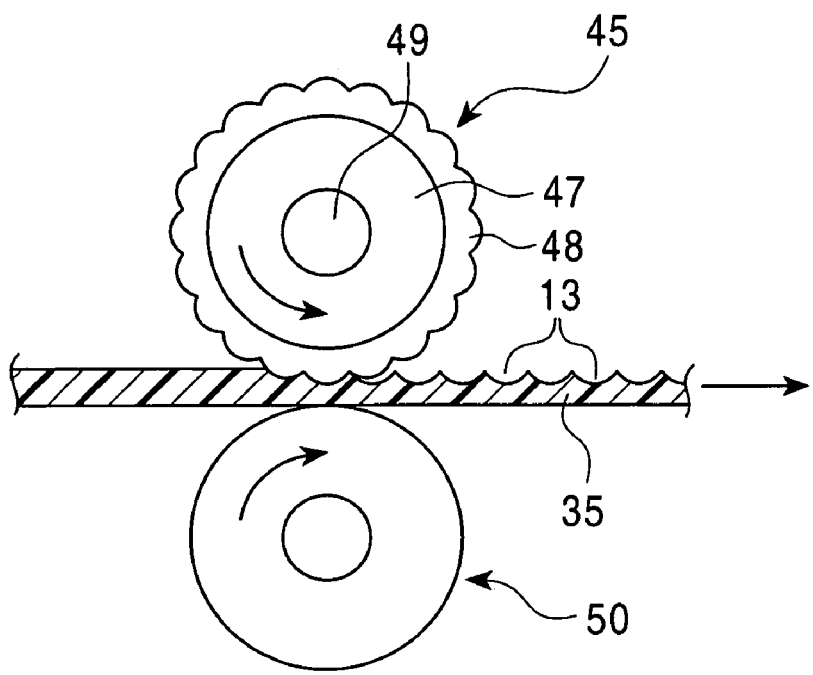
FIG. 24A is a drawing illustrating embossing the material with the mother die in the seventh embodiment.
Figure 24B:
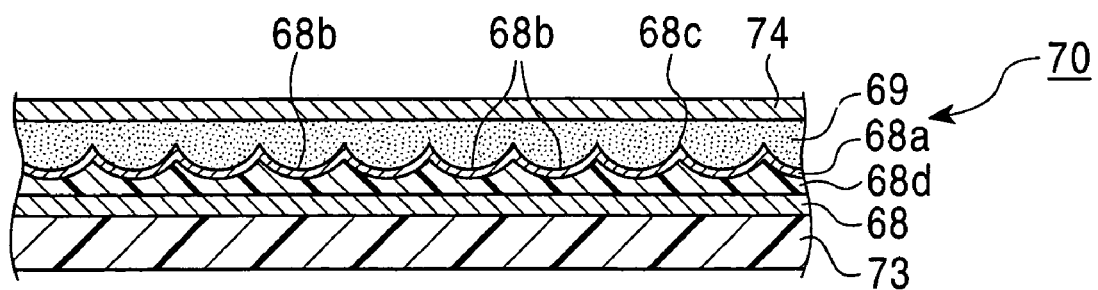
FIG. 24B is a drawing illustrating a reflective film, an adhesive layer and a protecting material laminated to a heat-embossed layer of the material in the seventh embodiment.

Next, as shown in FIG. 24A, the surface shape of the embossing mother die 45 is transferred to the layer 68 to be heat-embossed by embossing. Then, as shown in FIG. 24B, the reflective film 68a, the adhesive layer 69 and the protecting material 74 are laminated in that order on the heat-embossed layer 68 having the recesses 68b formed thereon to obtain the reflector 70 of this embodiment.

Although, in this embodiment, a thermoplastic resin is used for the heat-embossed layer 68, another embodiment may be made in which embossing is performed by a known method using, for example, an ultraviolet curing resin for the heat-embossed layer (embossed layer) 68, and an ultraviolet curing lamp and die.

Figure 25A:
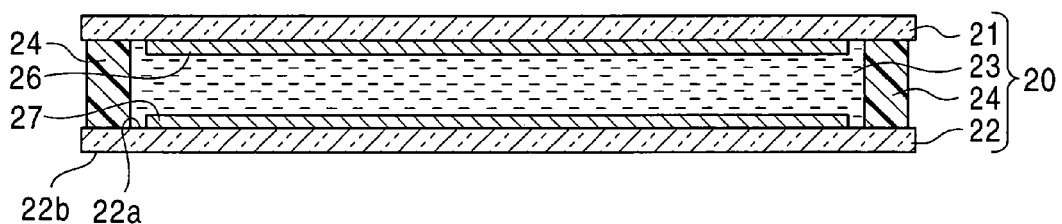
FIG. 25A is a drawing illustrating a liquid crystal display panel utilized in the seventh embodiment.

Next, as shown in FIG. 25A, the liquid crystal display panel 20 is prepared. The liquid crystal display panel 20 has the same construction as that of the liquid crystal display panel 20 shown in FIG. 19.

Figure 25B:
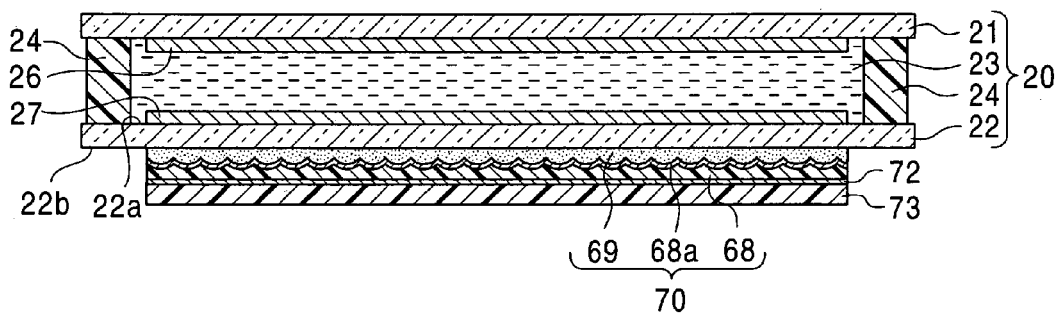
FIG. 25B is a drawing illustrating the reflector attached to the liquid crystal display panel of the seventh embodiment.
Figure 25C:
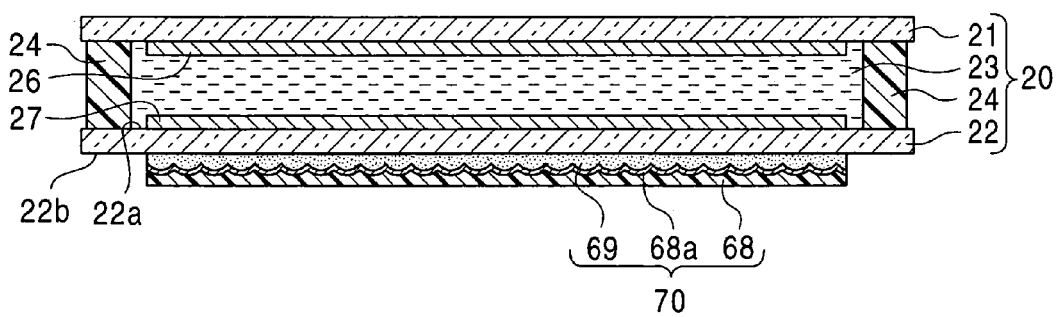
FIG. 25C is a drawing illustrating the separation of the separating layer and embossed base from the heat-embossed layer of the reflector of the seventh embodiment.

Next, as shown in FIG. 25B, the reflector 70 is attached to the outer surface 22b of the second substrate 22 of the liquid crystal display panel 20, and the separating layer 72 and the embossed base 73 are separated from the heat-embossed layer 68, as shown in FIG. 25C.

Furthermore, the front light 10 is disposed on the display surface side 21a of the liquid crystal display panel 20 to obtain the liquid crystal display device shown in FIG. 19.

As described in detail above, in the reflector 70 of this embodiment, the embossed base 73 can be separated from the heat-embossed layer (embossed layer) 68 so that the embossed base 73 can be separated after the reflector 70 is attached to the liquid crystal display panel 20, thereby permitting thinning of the reflector 70 and the liquid crystal display panel 20.

Since the embossed base 73 is provided, the strength of the whole reflector 70 can be compensated by the embossed base 73 even when the thickness of the heat-embossed layer (embossed layer) 68 is decreased. Therefore, heat embossing can be performed for the heat-embossed layer (embossed layer) 68 thinner than a conventional layer without any trouble. Also, the heat-embossed layer (embossed layer) 68 can be made thinner than a conventional layer, and even when the heat-embossed layer (embossed layer) 68 of the completed reflector greatly expands in an environment of high temperature, the lift force due to expansion is smaller than that of the conventional reflector 70. Therefore, separation from the liquid crystal display panel 20 can be prevented.

Since the separating layer 72 is provided between the heat-embossed layer (embossed layer) 68 and the embossed base 73, the embossed base 73 can easily be separated together with the separating layer 72.

Furthermore, the adhesive layer 69 and the protecting material 74 are laminated in order on the reflective surface 68c, and thus the protecting material 74 can be separated to expose the adhesive layer 69 so that the reflector 70 can be easily mounted on the liquid crystal display panel 20 with the adhesive layer 69. The adhesive layer 69 can also protect the reflective surface 68c.

The technical scope of the present invention is not limited to the above embodiments, and various changes can be made within the scope of the gist of the present invention. Namely, the present invention may be applied to a transflective liquid crystal display device instead of the reflective liquid crystal display device of this embodiment. In this case, a retardation plate and a polarization plate are disposed below the heat-embossed layer 68 shown in FIG. 19, and a back light is disposed outside the reflector instead of the front light. Furthermore, many holes may be formed in the highly reflective film 68a to transmit illuminating light from the back light. This case has the advantage that the total thickness of the retardation plate and the polarization plate disposed below the heat-embossed layer 68 is smaller than a conventional display device.

The shape of the recesses 68b provided on the reflector 70 may be changed to a shape according to any one of the eighth to tenth embodiments below.

Eighth Embodiment

A reflector according to an eighth embodiment of the present invention is formed by the same method as in the third embodiment.

The pitch of the adjacent recesses 68b is randomly set in the range of 3 μm to 100 μm. When the pitch of the adjacent recesses 68b is less than 3 μm, the production of a mother die used for forming a heat-embossed layer is limited to cause the problem of significantly increasing the processing time, failing to form a shape suitable for achieving the desired reflection characteristic, and producing interference light.

Figure 26:
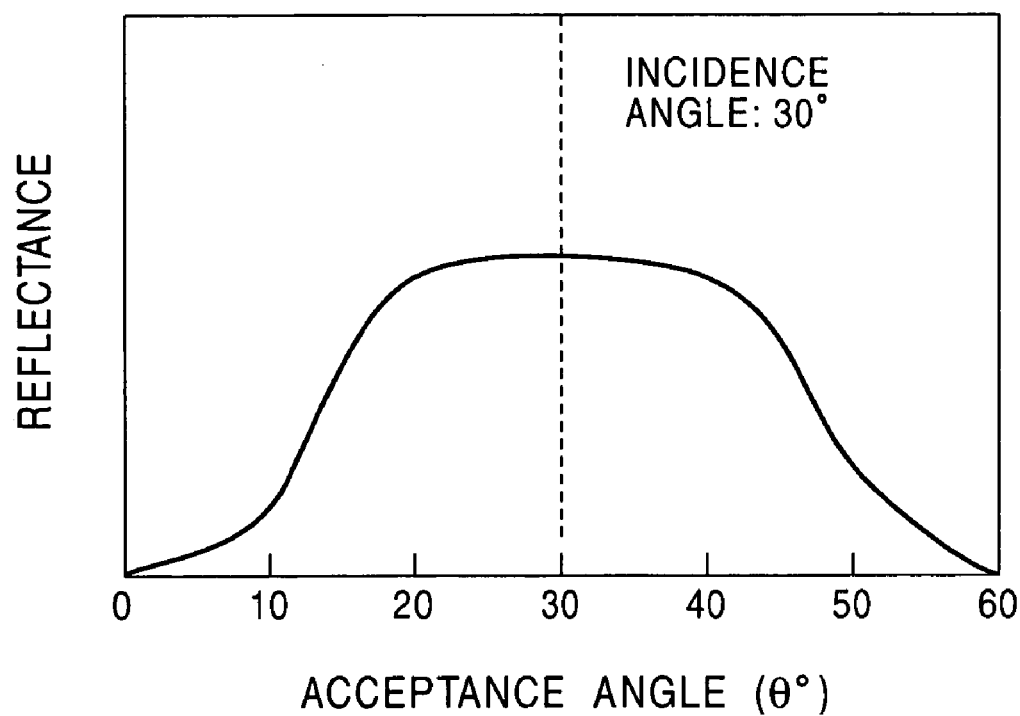
FIG. 26 is a graph showing the reflection property of a reflector according to an eighth embodiment of the present invention.

In the reflector of this embodiment, the reflectance can be made substantially constant in a symmetric wide of acceptance angles with the regular reflection direction as a center, as shown in a graph of FIG. 26.

Ninth Embodiment

A reflector according to a ninth embodiment of the present invention is formed by the same method as in the fourth embodiment.

Figure 27:
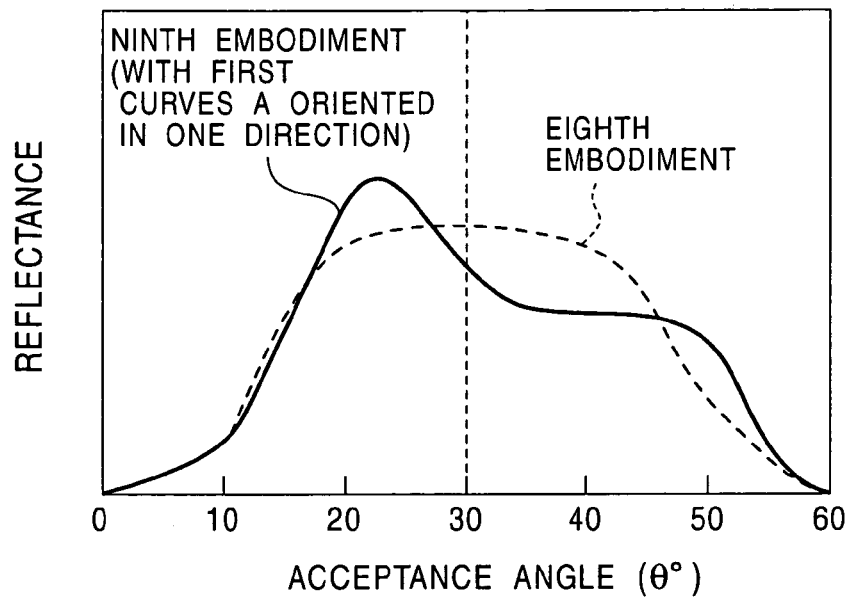
FIG. 27 is a graph showing the reflection property of a reflector according to a ninth embodiment of the present invention.

In the reflector of this embodiment, the reflectance becomes maximum with a reflection angle smaller than the reflection angle of 30° in the regular reflection direction, and the reflection near the maximum as a peak is also increased, as shown in a graph of FIG. 27. The graph of FIG. 27 also shows the relationship between the acceptance angle and reflectance of the reflector of the eighth embodiment for comparison of both reflectors.

Therefore, in the reflector of this embodiment, each of the recesses 68b constituting the reflective surface has the above-described shape, and thus light emitted from an illuminating light source can be effectively reflected and scattered. Also, the light reflected by the reflector has the directivity that reflectance is increased in a specified direction. Thus, the emission angle of the reflected light emitted through the reflector is widened, and the emission efficiency can be improved at a specified emission angle.

Tenth Embodiment

A reflector according to a tenth embodiment of the present invention is formed by the same method as in the fifth embodiment.

Figure 28:
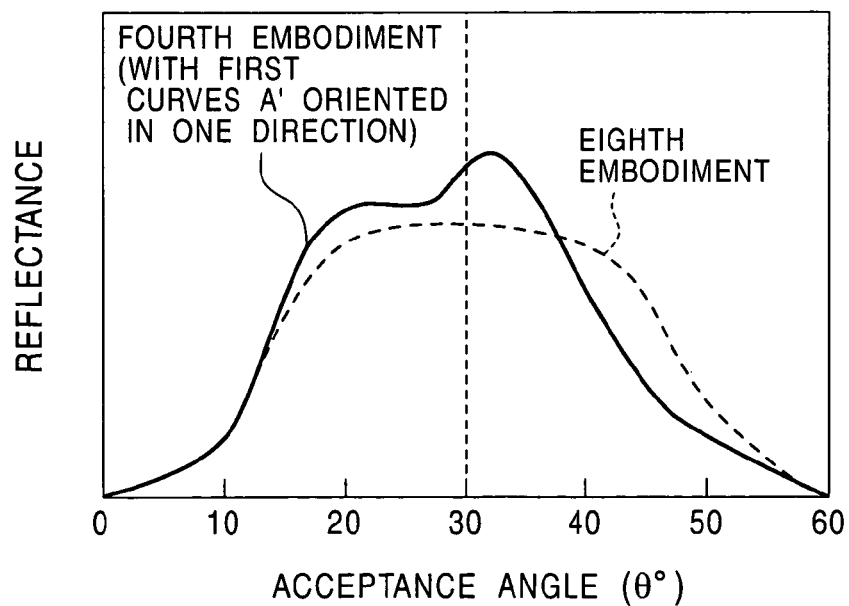
FIG. 28 is a graph showing the reflection property of a reflector according to a tenth embodiment of the present invention.
Figure 29:
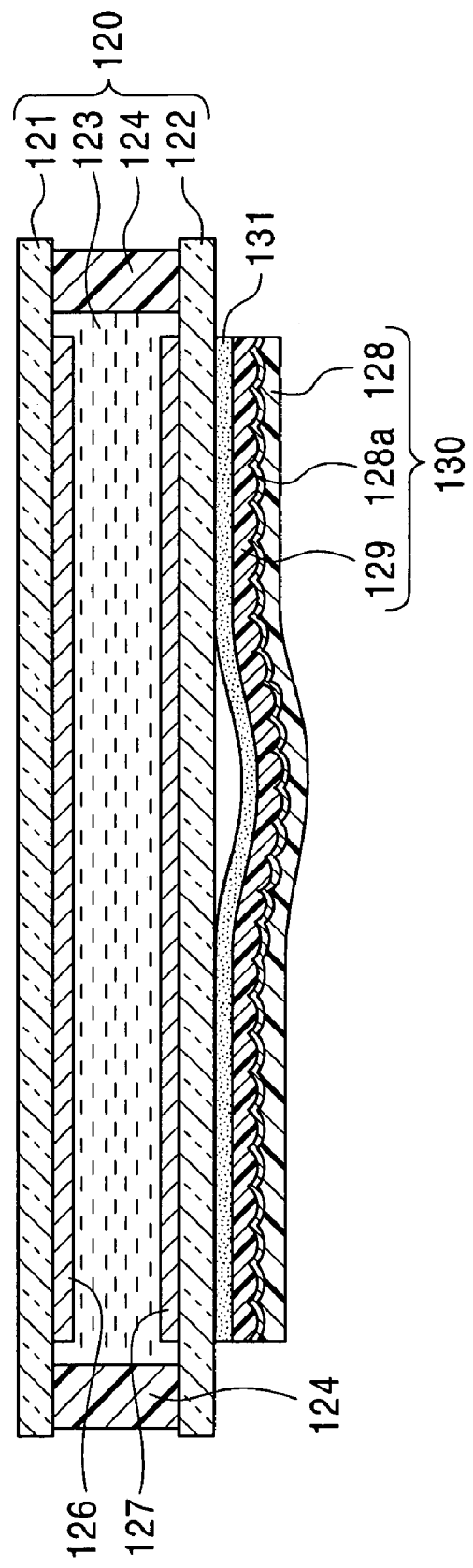
FIG. 29 is a schematic view illustrating a problem of a conventional liquid crystal display device.

As shown in a graph of FIG. 28, in the reflector of this embodiment, incident light can be effectively reflected and scattered. Also, the light reflected by the reflector has the directivity that reflectance is increased in a specified direction. Thus, the emission angle of the reflected light emitted through the reflector is widened, and the emission efficiency can be improved at a specified emission angle.

As described in detail above, a reflector of the present invention comprises a lamination of a heat-embossed layer and a moisture-proof base material, and thus moisture penetration from the opposite side of the heat-embossed layer to a reflective surface can be prevented by the moisture-proof base material to prevent the oxidation of a highly reflective film, thereby keeping the reflectance of the reflector high over a long period of time.

When the heat-embossed layer comprises a lamination of a processed resin layer and a support resin layer, the support layer exhibiting a high glass transition temperature is disposed on the moisture-proof base material side to block moisture penetration into the processed resin layer, thereby preventing the oxidation of the highly reflective film and keeping the reflectance of the reflector high. Also, since the processed resin layer having a lower glass transition temperature than that of the support resin layer and excellent processability is disposed on the reflective surface side, recesses can easily be formed in the reflective surface, thereby forming the reflector having an excellent reflection characteristic.

In the reflector of the present invention, an embossed base can be separated from the embossed layer so that the embossed base is separated after the reflector is mounted on a liquid crystal display panel, thereby thinning the whole reflector.

Also, the embossed base separable from the embossed layer is provided, and thus the strength of the whole reflector is compensated by the embossed base even when the embossed layer is thinned. Therefore, heat embossing can be performed for the embossed layer thinner than a conventional layer. Furthermore, the embossed layer can be made thinner than a conventional layer, and even when the embossed layer greatly expands in an environment of high temperature, the lift force due to expansion is smaller than that in a conventional reflector, and thus separation from a liquid crystal display panel can be prevented.

What is claimed is:

1. A reflector attached to an outer surface of a glass substrate comprising:
    an adhesive layer attached to the glass substrate;
    a reflective film;
    a processed resin layer having a plurality of recesses, which define a reflection characteristic of the reflective film; and
    a moisture-proof film base that supports the processed resin layer,
    a support resin layer having a high glass transition temperature interposed between the processed resin layer and the moisture-proof film base,
    wherein the support resin layer having a higher class transition temperature and lower moisture absorption property than those of the processed resin layer,
    wherein the reflective film is disposed between the adhesive film and brought into direct contact with the processed resin layer such that a shape of the plurality of recesses of the processed resin layer is reflected in the reflective film and wherein the adhesive film and the glass substrate, in that order, are laminated upon the reflective film, wherein the recesses are formed in a spherical shape for reflection and randomly arranged, and contact portions between the recesses are formed in a peaked shape, and
    wherein the moisture-proof film base includes a material with low moisture absorption and low moisture permeation and has a thickness of 0.05 to 1 mm.

2. The reflector according to claim 1, wherein the moisture-proof film base includes polyphenylene sulfide or polyvinylidene fluoride.

3. The reflector according to claim 1, wherein a thickness of the reflective film is between 80 nm and 200 nm.

4. The reflector according to claim 1, wherein the support resin layer includes polyphenylene sulfide or polyvinylidene fluoride.

5. The reflector according to claim 1, wherein the materials of the support resin layer and the moisture-proof film base are the same,
    wherein the support resin layer and the moisture-proof film base have the same material, and
    wherein the support resin layer and the moisture-proof film base have flexibility.

6. A method of forming a reflector attached to the outer surface of a glass substrate, the reflector including an adhesive layer attached to the glass substrate, a reflective film, a processed resin layer having a plurality of recesses which define a reflection characteristic of the reflective film, a moisture-proof film base for supporting the processed resin layer, and a support resin layer having a higher glass transition temperature and lower moisture absorption property than those of the processed resin layer, the method comprising:
    pressing a roll-shaped embossing mother die having an irregular surface onto the surface of the processed resin layer,
    rotating the roll-shaped embossing mother die to transfer the irregular shape of the roll to the processed resin layer,
    interposing the support resin layer between the processed resin layer and the moisture-proof film base,
    curing the processed resin layer,
    reflecting the plurality of recesses of the process resin layer in the reflective film by bringing the reflective film into direct contact with the processed resin layer, and
    laminating the adhesive film and the glass substrate, in that order, upon the reflective film
    wherein the recesses are formed in a spherical shape for reflection and are randomly arranged, and
    wherein contact portions between the recesses are formed in a peaked shape.

7. The method according to claim 6, wherein the roll-shaped embossing mother die includes a cylindrical embossing roll and an electroforming plate wound on the embossing roll, the surface of the electroforming plate having irregularities corresponding to the shape of the recesses.

8. The method according to claim 6, wherein the roll-shaped embossing mother die includes heating surface to heat the processed resin layer.

9. The method according to claim 6, wherein a thickness of the reflective film is between 80 nm and 200 nm.

* * * * *

UNITED STATES PATENT AND TRADEMARK OFFICE
CERTIFICATE OF CORRECTION

PATENT NO. : 7,567,318 B2  Page 1 of 1
APPLICATION NO. : 10/722907
DATED : July 28, 2009
INVENTOR(S) : Tetsushi Tanada et al.

It is certified that error appears in the above-identified patent and that said Letters Patent is hereby corrected as shown below:

In column 22, claim 6, line 40, immediately after "reflective film" insert --,--.

Signed and Sealed this

Twenty-seventh Day of October, 2009

David J. Kappos
*Director of the United States Patent and Trademark Office*